(12) United States Patent
Kim et al.

(10) Patent No.: US 11,073,323 B2
(45) Date of Patent: Jul. 27, 2021

(54) EVAPORATOR AND REFRIGERATOR COMPRISING SAME

(71) Applicant: LG ELECTRONICS INC., Seoul (KR)

(72) Inventors: Seungyoun Kim, Seoul (KR); Geunhyung Lee, Seoul (KR); Minjae Jeong, Seoul (KR); Hyunwoo Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 122 days.

(21) Appl. No.: 16/321,170

(22) PCT Filed: Jul. 27, 2017

(86) PCT No.: PCT/KR2017/008126
§ 371 (c)(1),
(2) Date: Jan. 28, 2019

(87) PCT Pub. No.: WO2018/021857
PCT Pub. Date: Feb. 1, 2018

(65) Prior Publication Data
US 2019/0186808 A1    Jun. 20, 2019

(30) Foreign Application Priority Data
Jul. 29, 2016 (KR) .................. 10-2016-0097397

(51) Int. Cl.
*F25D 21/12* (2006.01)
*F25B 39/02* (2006.01)
(Continued)

(52) U.S. Cl.
CPC .............. *F25D 21/12* (2013.01); *F25B 39/02* (2013.01); *F25B 39/022* (2013.01); *F25D 11/02* (2013.01);
(Continued)

(58) Field of Classification Search
CPC .......... F25D 21/12; F25D 21/06; F25D 11/02; F25D 21/08; F25B 39/02; F25B 39/022;
(Continued)

(56) References Cited

U.S. PATENT DOCUMENTS

| 2,619,811 | A | * | 12/1952 | Philipp | ................. F25B 39/024 |
| | | | | | 62/519 |
| 2,977,454 | A | * | 3/1961 | Volker | ..................... H05B 3/82 |
| | | | | | 392/498 |
| 2006/0185386 | A1 | * | 8/2006 | Katoh | ................. F28D 1/05391 |
| | | | | | 62/515 |

FOREIGN PATENT DOCUMENTS

| CN | 104089437 | | 10/2014 |
| GB | 854711 | * | 11/1960 |

(Continued)

OTHER PUBLICATIONS

International Search Report (with English Translation) and Written Opinion dated Nov. 23, 2017 issued in Application No. PCT/KR2017/008126.

*Primary Examiner* — Elizabeth J Martin
(74) *Attorney, Agent, or Firm* — Ked & Associates, LLP

(57) ABSTRACT

An evaporator comprises: an evaporator case having first and second case sheets coupled to each other and bent such that both sides of the evaporator case are open, thereby forming a box shape, a food storing space being formed inside the evaporator case; a cooling tube provided as an empty space between the first and second case sheets, thereby forming a cooling channel through which a refrigerant flows; and a heating tube formed as an empty space between the first and second case sheets so as not to overlap with the cooling tube, thereby forming a heating channel for defrosting, wherein the cooling tube and the heating tube are (Continued)

shaped to protrude to the outside of the evaporator case, and the evaporator case has an inner surface formed to be flat.

20 Claims, 19 Drawing Sheets

(51) Int. Cl.
*F25D 11/02* (2006.01)
*F25D 21/08* (2006.01)
*F28D 1/047* (2006.01)
*F25D 21/14* (2006.01)
*F28D 21/00* (2006.01)

(52) U.S. Cl.
CPC ............ *F25D 21/08* (2013.01); *F25D 21/14* (2013.01); *F28D 1/0477* (2013.01); *F25B 2339/022* (2013.01); *F25D 2500/02* (2013.01); *F28D 2021/0071* (2013.01); *F28F 2255/14* (2013.01); *Y02B 30/56* (2013.01)

(58) Field of Classification Search
CPC ............ F25B 41/022; F25B 2313/0211; F25B 2347/02; F25B 2347/021; F25B 2339/022
See application file for complete search history.

(56) References Cited

FOREIGN PATENT DOCUMENTS

| | | |
|---|---|---|
| GB | 854771 | 11/1960 |
| JP | 08-313144 | 11/1996 |
| JP | 2015-152218 | 8/2015 |
| KR | 20-0152176 | 7/1999 |
| KR | 10-0246378 | 4/2000 |

* cited by examiner

US 11,073,323 B2

EVAPORATOR AND REFRIGERATOR COMPRISING SAME

CROSS-REFERENCE TO RELATED PATENT APPLICATIONS

This application is a U.S. National Stage Application under 35 U.S.C. § 371 of PCT Application No. PCT/KR2017/008126, filed Jul. 27, 2017, which claims priority to Korean Patent Application No. 10-2016-0097397, filed Jul. 29, 2016, whose entire disclosures are hereby incorporated by reference.

FIELD

The present disclosure relates to an evaporator having a defrosting device for removing frost, and a refrigerator having the same.

BACKGROUND

The refrigerator is a device for keeping food stored in the refrigerator at low temperatures using cold air generated by a refrigerating cycle in which a process of compression, condensation, expansion, and evaporation is continuously performed.

A refrigerating cycle in a refrigerating chamber (or refrigerating compartment) includes a compressor compressing a refrigerant, a condenser condensing the refrigerant in a high-temperature and high-pressure state compressed by the compressor through heat dissipation, and an evaporator cooling ambient air according to a cooling operation of absorbing ambient latent heat as the refrigerant provided from the condenser is evaporated. A capillary or an expansion valve is provided between the condenser and the evaporator to increase a flow rate of the refrigerant and lower pressure so that the refrigerant flowing to the evaporator may easily be evaporated.

A cooling method of the refrigerator may be divided into an indirect cooling method and a direct cooling method.

The indirect cooling method is a method of cooling the inside of a storage chamber by forcibly circulating cold air generated by the evaporator using a blow fan. Generally, the indirect cooling method is applied to a structure in which a cooler chamber in which an evaporator is installed and a storage chamber in which food is stored are separated from each other.

The direct cooling method is a method in which the inside of a storage chamber is cooled by natural convection of cold air generated by an evaporator. The direct cooling method is largely applied to a structure in which an evaporator is formed in an empty box form to form a storage chamber in which food is stored.

Generally, a direct cooling type refrigerator employs a roll-bond type evaporator in which two case sheets with a pattern part interposed therebetween are pressure-welded, high pressure air is blown into the compressed pattern part to discharge the pattern part, and a portion where the pattern part was present is expanded to form a cooling channel in which a refrigerant flows between the two pressure-welded case sheets.

Meanwhile, a difference in relative humidity between a surface of the evaporator and ambient air may cause moisture to be condensed to develop to frost on the surface of the evaporator. The frost deposited on the surface of the evaporator acts as a factor to degrade heat exchange efficiency of the evaporator.

In general, in the case of the direct cooling type refrigerator provided with a roll-bond type evaporator, a method of performing natural defrosting for a predetermined time after the compressor is forcibly turned off is used to remove frost. Such natural defrosting method causes user inconvenience and is difficult to ensure freshness of food due to a long defrosting time.

As a technique for solving such a problem, United Kingdom Patent Laid-Open Publication No. 854771 (published on Nov. 23, 1960) discloses a structure in which a tube for transmitting heat is formed to surround an evaporator. In this structure, a working fluid contained in a water storage tank is heated by a heater and moves along the pipe, thereby melting frost deposited in the evaporator to remove it.

However, this technique has a fundamental problem that since the tube is installed in the evaporator, contact resistance between the tube and the evaporator is too large to exhibit a defrosting effect. Further, since a water storage tank and the heater are provided separately from the evaporator, a total volume of the evaporator including a defrost device (including the water storage tank, the heater, and the tube) becomes large, making it difficult to secure capacity of a freezing chamber.

In addition, the general roll-bond type evaporator has a shape in which a portion where a cooling flow channel is formed protrudes to the inside and outside of an evaporator case. Therefore, there is a problem that defrost water is held between the cooling tubes protruding to the inside of the evaporator case and is not drained. This leads to a problem that, when the cooling function is operated again, the undrained defrost water is frozen and adhered to food stored inside or gradually increased in volume to degrade heat exchange efficiency of the evaporator.

RELATED ART DOCUMENT

UK Patent Laid-Open Publication No. 854771 (published on Nov. 23, 1960)

SUMMARY

An aspect of the present disclosure provides an evaporator having a novel structure in which a heating flow channel through which a working fluid may flow is formed or a hot wire heater is embedded in a roll-bond type evaporator case applied to a direct cooling type refrigerator.

Another aspect of the present disclosure provides an evaporator having a novel structure in which defrost water may be smoothly drained.

According to an aspect of the present disclosure, there is provided an evaporator including: an evaporator case having a box shape in which both sides are open as mutually coupled first and second case sheets are bent, and forming a storage space of food therein; a cooling tube remaining as an empty space between the first and second case sheets and forming a cooling flow channel in which a refrigerant flows; and a heating tube remaining as an empty space between the first and second case sheets not to overlap the cooling tube and forming a heating flow channel for defrosting, wherein the cooling tube and the heating tube protrude outwards from the evaporator case and an internal surface of the evaporator case is formed to be flat.

The cooling tube and the heating tube may each be formed by a plane portion of the first case sheet forming an inner surface of the evaporator case; and a convex portion of the second case sheet forming an outer surface of the evaporator case.

A height from one surface of the second case sheet to an uppermost end of the convex portion may be 1.6 mm to 1.8 mm.

At least one of a lower surface and an upper surface of the evaporator case may have a first sloped portion formed to be sloped at an obtuse angle with respect to a left side surface; and a second sloped portion formed to be sloped at an obtuse angle with respect to a right side surface and connected to the first sloped portion at an obtuse angle.

The angles at which the first and second sloped portions are sloped with respect to the left side surface and the right side surface may be 93° to 95°, respectively.

A drain hole may be formed at a connection portion between the first sloped portion and the second sloped portion formed at the lower surface of the evaporator case.

The evaporator case may have a lower surface, a left side surface and a right side surface respectively extending to both sides from the lower surface, and a left side upper surface and a right side upper surface respectively extending from the left side surface and the right side surface to face the lower surface.

Here, the lower surface may have a first sloped portion and a second sloped portion formed to be sloped downwards toward inner sides facing each other.

Also, the left side upper surface may extend to be upwardly sloped from the left side surface and the right side upper surface may extend to be upwardly sloped from the right side surface so as to be sloped with respect to the left side upper surface. Here, an end portion of the left side upper surface and an end portion of the right side upper surface may be disposed to face each other.

A working fluid for defrosting may be filled in the heating tube, and a heater configured to heat the working fluid inside the heating tube may be adhered to an outer surface of the evaporator case corresponding to the heating tube.

The heater may be adhered to a lower portion of the lower surface of the evaporator case.

The heating tube may include a chamber allowing the heater to be adhered thereto to heat the working fluid therein and including an outlet through which the working fluid heated by the heater is discharged and an inlet through which a cooled working fluid is collected; and a flow pipe connected to the outlet and the inlet to form a flow channel in which the working fluid flows.

A width of the chamber may be 10 mm to 12 mm, and a length of the chamber may be 47 mm to 80 mm.

The chamber may be provided on a lower surface of the evaporator case or at a lower portion of one of the left and right side surfaces of the evaporator case, and the flow pipe may extend toward an upper side of the evaporator case.

A sectional area of the outlet may be equal to or greater than a sectional area of the inlet.

A heat conductive adhesive may be interposed between the chamber and the heater.

The heater may include: a base plate formed of a ceramic material and adhered to the chamber; hot wire formed at the base plate and generating heat wen a driving signal is received from a controller; and a terminal formed at the base plate and electrically connecting the hot wire and a lead wire.

An insulating material may be interposed between a rear surface of the heater and the sealing member.

The heating tube may be formed to surround at least a portion of the cooling tube.

The chamber may extend inwards toward the cooling tube.

The cooling tube may surround at least a portion of the heating tube.

The outlet may include a first outlet and a second outlet respectively provided on both sides of the chamber, the inlet may have a first inlet and a second inlet respectively provided on both sides of the chamber, and the flow pipe may be connected to the first and second outlets, extend to both sides of the chamber so as to become away from the chamber, and extend to become close to the chamber so as to be connected to the first and second inlets.

The evaporator case may be formed by bending a metal frame having a plate-like shape, a first opening and a second opening of the heating tube may be formed at one end portion of the metal frame, and as the first opening and the second opening are connected to each other by a connection pipe, the heating tube may form a circulation flow channel having a closed loop shape in which the working fluid circulates together with the connection pipe.

The evaporator may further include a hot wire heater inserted into the heating tube to surround the evaporator case and generating heat when power is applied to transmit heat for defrosting to the evaporator case.

The heating flow channel may include a first heating flow channel and a second heating flow channel respectively disposed on both sides of the cooling flow channel and opened at both ends of the evaporator case.

The first and second heating flow channels may extend along both sides of the two case sheets which are coupled to each other.

The evaporator case may have a lower surface, a left side surface and a right side surface respectively extending to both sides from the lower surface, and a left side upper surface and a right side upper surface respectively extending from the left side surface and the right side surface to face the lower surface, and the both open end portions of the first and second heating flow channels may be disposed to face each other at an upper portion of the evaporator case.

The hot wire heater may include a first portion inserted into the first heating flow channel; a second portion inserted into the second heating flow channel; and a connection portion connecting the first portion and the second portion on an outer side of the evaporator case.

The first portion may surround a front portion of the evaporator case and the second portion may surround a rear portion of the evaporator case.

The evaporator may further include a heat-resistant tube surrounding the connection portion and formed of a heat-resistant material.

A remaining internal space excluding the hot wire heater in the first and second heating flow channels may be filled with a filler for heat transmission.

A packing member may be mounted at both ends of the first and second heating flow channels to prevent leakage of the filler.

The hot wire heater may include: a core portion formed of a heat insulating material; a hot wire portion wound around the core portion and generating heat when power is applied; and a covering portion formed of a heat-resistant material and covering the hot wire portion.

According to another aspect of the present disclosure, there is provided an evaporator including: an evaporator case having a box shape in which both sides are open as mutually coupled first and second case sheets are bent, and forming a storage space of food therein; a cooling tube remaining as an empty space between the first and second case sheets and forming a cooling flow channel in which a refrigerant flows; and a heating tube remaining as an empty space between the first and second case sheets not to overlap the cooling tube and forming a heating flow channel for defrosting, wherein at least one of a lower surface and an upper surface of the evaporator case has a first sloped portion formed to be sloped at an obtuse angle with respect to a left side surface and a second sloped portion formed to be sloped at an obtuse angle with respect to a right side surface and connected to the first sloped portion at an obtuse angle.

A drain hole may be formed at a connection portion between the first sloped portion and the second sloped portion formed at the lower surface of the evaporator case.

The drain hole may be provided in plurality and disposed between the cooling tube and the heating tube.

The heating tube may be filled with a working fluid for defrosting or a hot wire heater generating heat when power is applied may be inserted into the heating tube.

According to another aspect of the present disclosure, there is provided a method for manufacturing an evaporator including: disposing a first pattern portion and a second pattern portion between first and second case sheets in a non-overlapping manner; bonding the first and second case sheets; tightly attaching the first case sheet to a first jig plate and disposing a second jig plate to be spaced apart from the second case sheet; spraying high pressure air to the first pattern portion and the second pattern portion exposed to the outside from the first and second sheets to form a cooling tube for cooling corresponding to the first pattern portion and a heating tube for defrosting corresponding to the second pattern portion; and bending the mutually bonded first and second case sheets to form a box-shaped evaporator case opened forwards and backwards.

The cooling tube and the heating tube may protrude to the outside of the evaporator case and an inner surface of the evaporator case may be formed to be flat.

The cooling tube and the heating tube may each be formed by a plane portion of the first case sheet forming an inner surface of the evaporator case; and a convex portion of the second case sheet forming an outer surface of the evaporator case.

The degree of protruding of the convex portion may be limited by a distance of the second jig plate with respect to the first jig plate.

The method may further include: inserting a hot wire heater for defrosting into the heating tube, after the forming of the cooling tube and the heating tube.

The heating tube may include a first heating flow channel and a second heating flow channel disposed on both sides of the cooling tube, and the hot wire heater may be configured to extend to the outside of the evaporator case through the first heating flow channel and pass through the second heating flow channel.

The effects of the present disclosure obtained through the above-described solution are as follows.

First, the evaporator having a new structure in which the cooling tube and the heating tube are formed as a roll-bond type in the evaporator case and the cooling tube is filled with a refrigerant and the heating tube is filled with a working fluid or has a hot wire heater inserted therein may be provided. According to the present disclosure, defrost time may be reduced compared to existing natural defrosting, maintaining freshness of food, and cooling efficiency, which has been reduced due to frost, may be increased to reduce power consumption.

Further, since the heating tube is embedded in the evaporator case, defrost heat may be more efficiently used for defrosting than in the related art structure, and since substantially no space required separately for forming the defrosting device is required, capacity of a freezing compartment may be maximized.

Second, in the structure in which the cooling tube and the heating tube are formed by bonding the flat first case sheet and the curved second case sheet, when the flat first case sheet forms the inner surface of the evaporator case, there is no part where defrost water gathers, and thus, defrost water may be smoothly drained.

When the lower surface of the evaporator case has the first and second sloped portions formed to be sloped at an obtuse angle with respect to the left side surface and the right side surface and connected to each other at an obtuse angle, since defrost water gathers at the connection portion between the first and second sloped portions, and thus, defrost water may be smoothly drained.

In addition, when the upper surface of the evaporator case has the first and second sloped portions formed to be sloped at an obtuse angle with respect to the left side surface and the right side surface, defrost water generated on the upper surface flows along the first and second sloped portions of the upper surface to the left side surface and the right side surface, respectively, and thus, defrost water may be prevented from falling directly to stored food.

BRIEF DESCRIPTION OF THE DRAWINGS

The embodiments will be described in detail with reference to the following drawings in which like reference numerals refer to like elements wherein.

DETAILED DESCRIPTION

Figure 1:
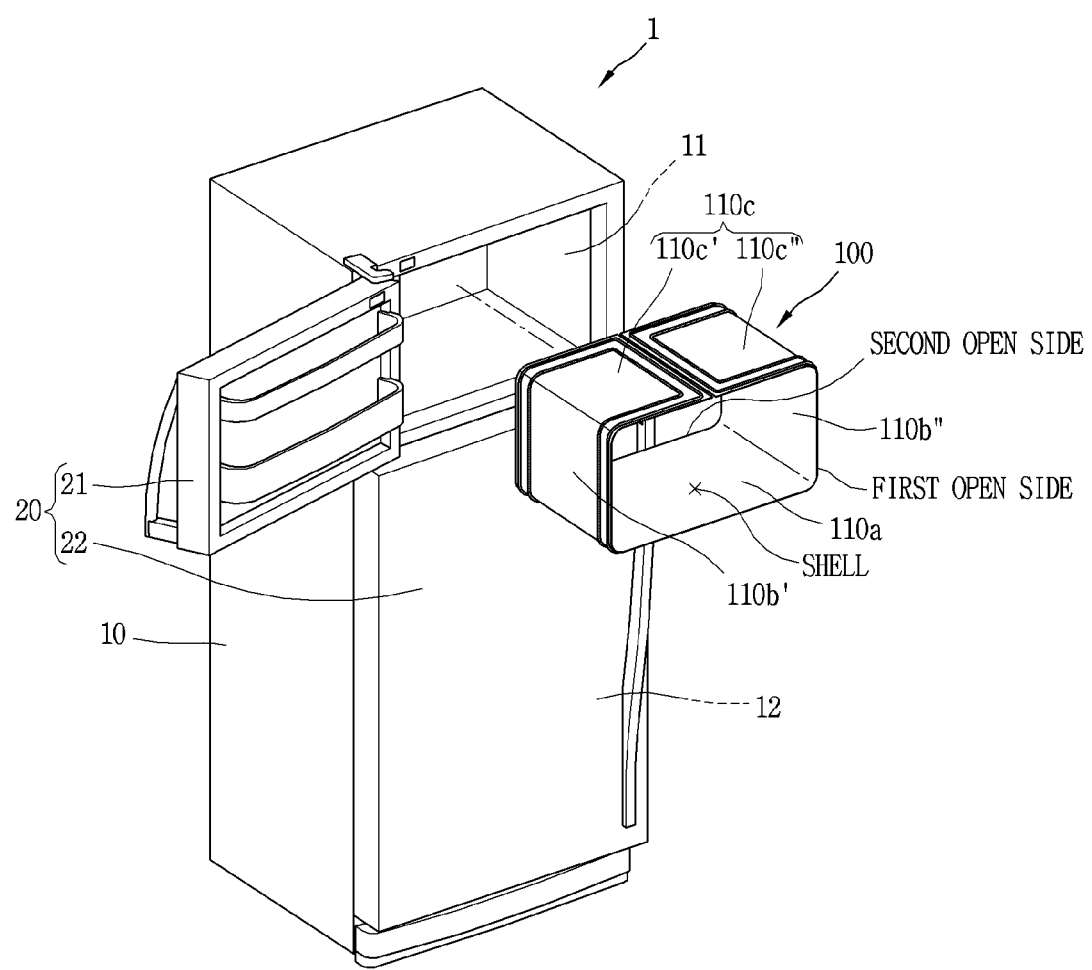
FIG. 1 is a conceptual view illustrating a refrigerator according to an embodiment of the present disclosure.

Hereinafter, an evaporator and a refrigerator having the evaporator according to the present disclosure will be described in detail with reference to the accompanying drawings.

In the present disclosure, the same reference numerals are given to the same or similar components in the different embodiments, and a redundant description thereof will be omitted.

In addition, the structure applied to any one embodiment may be applied in the same manner to another embodiment as long as the different embodiments are not structurally and functionally inconsistent.

As used herein, the singular forms "a", "an" and "the" are intended to include the plural forms as well, unless the context clearly indicates otherwise.

In the following description, when the detailed description of the relevant known function or configuration is determined to unnecessarily obscure the important point of the present disclosure, the detailed description will be omitted.

The accompanying drawings of the present disclosure aim to facilitate understanding of the present disclosure and should not be construed as limited to the accompanying drawings. Also, the present disclosure is not limited to a specific disclosed form, but includes all modifications, equivalents, and substitutions without departing from the scope and spirit of the present disclosure.

FIG. 1 is a conceptual view illustrating a refrigerator 1 according to an embodiment of the present disclosure.

The refrigerator 1 is a device for keeping food stored therein at low temperatures using cold air generated by a refrigerating cycle in which a process of compression, condensation, expansion, and evaporation is continuously performed.

As illustrated, a cabinet 10 has a storage space for storing food therein. The storage space may be separated by a partition wall and may be divided into a freezing chamber (or a freezing compartment) 11 and a refrigerating chamber (or a refrigerating compartment) 12 according to set temperatures.

In the present embodiment, a top mount type refrigerator in which the freezing chamber 11 is disposed on the refrigerating chamber 12 is illustrated, but the present disclosure is not limited thereto. The present disclosure is also applicable to a side-by-side type refrigerator in which a freezing chamber and a refrigerating chamber are disposed on the left and right, and a bottom freezer type refrigerator in which a refrigerating chamber is provided at an upper portion thereof and a freezing chamber is provided at a lower portion thereof.

A door 20 is connected to the cabinet 10 to open and close a front opening of the cabinet 10. In the figure, a freezing chamber door 21 and a refrigerating chamber door 22 are configured to open and close the front openings of the freezing chamber 11 and the refrigerating chamber 12, respectively. The door 20 may be variously configured as a rotatable door rotatably connected to the cabinet 10, a drawer-type door slidably connected to the cabinet 10, and the like.

A machine chamber (not illustrated) is provided in the cabinet 10, and a compressor, a condenser, and the like, are provided in the machine chamber. The compressor and the condenser are connected to the evaporator 100 to constitute a refrigerating cycle.

Meanwhile, a refrigerant R circulating in the refrigerating cycle absorbs ambient heat in the evaporator 100 as evaporation heat, thereby obtaining a cooling effect in the periphery. In this process, when a temperature difference with ambient air occurs, moisture in the air is condensed and frozen on the surface of the evaporator 100, that is, frost is deposited thereon. Frost deposited on the surface of the evaporator 100 acts as a factor to lower the heat exchange efficiency of the evaporator 100.

As described above in the background of the present disclosure, in the case of a direct cooling type refrigerator, the structure in which a tube for transmitting heat is formed to enclose an evaporator in order to remove frost deposited on the evaporator. However, this structure has problems that heat exchange efficiency is low due to the occurrence of heat loss, capacity of a freezing chamber is reduced due to a defrosting device which occupies a volume, and defrost water collects between cooling flow channels to hinder smooth drainage.

Thus, the present disclosure proposes a new type of evaporator 100 that may solve the above problems.

Figure 2:
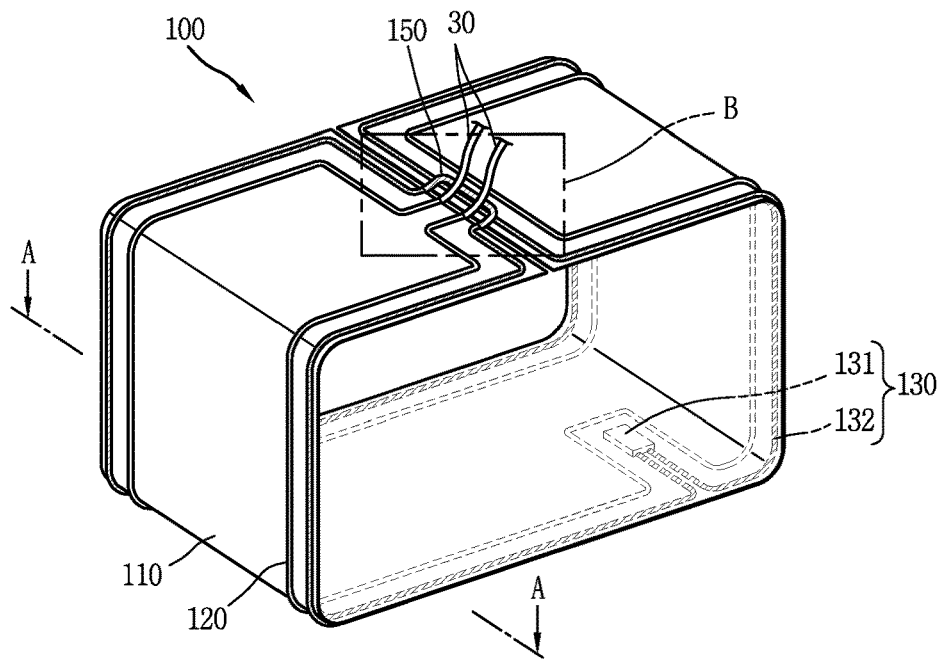
FIGS. 2 and 3 are conceptual views of a first embodiment of an evaporator applied to the refrigerator of FIG. 1, viewed from different directions.
Figure 3:
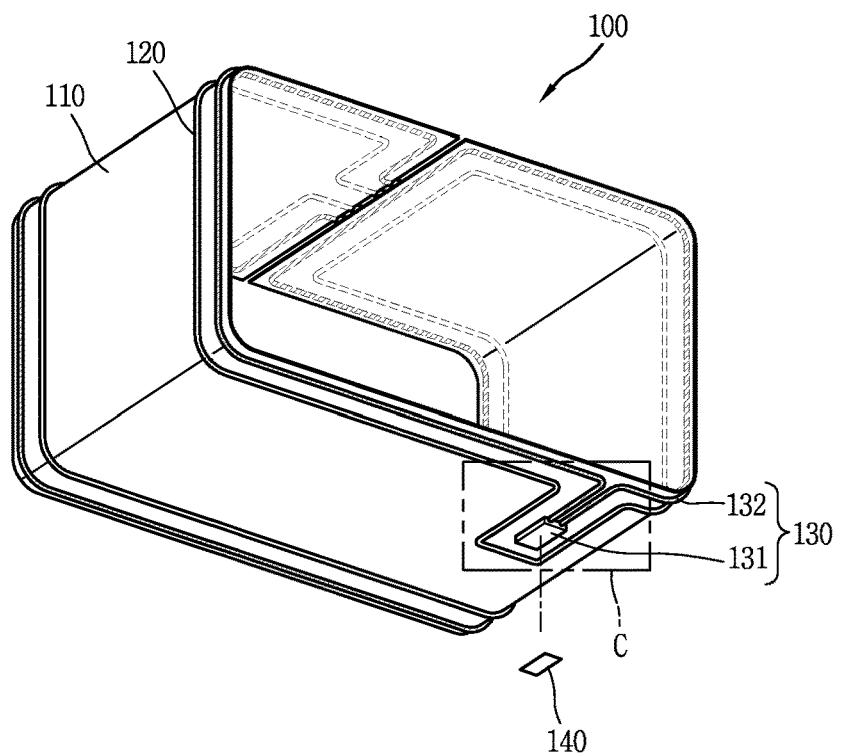

FIG. 2 and FIG. 3 are conceptual views illustrating a first embodiment of the evaporator 100 applied to the refrigerator 1 of FIG. 1m viewed from different directions.

Referring to FIGS. 2 and 3, the evaporator 100 of the present disclosure includes an evaporator case 110, a cooling tube 120, a heating tube 130, and a heater 140. Among the components of the evaporator 100, the cooling tube 120 is a component for cooling and the heating tube 130 and the heater 140 are components for defrosting.

The evaporator case 110 is formed by bending a plate-shaped frame in which first and second case sheets 111 and 112 are coupled to each other, in the form of an empty box. Referring to FIG. 1, the evaporator case 110 may be formed in a rectangular box shape opened forwards and backwards. Specifically, the evaporator case 110 includes a bottom surface 110a, a left side surface 110b' and a right side surface 110b" which are vertically erected on both sides of the bottom surface 110a, and a left side upper surface 110c' and a right side upper surface 110c" respectively extending from the left side surface 110b and the right side surface 110b" and disposed to face the bottom surface 110a.

The evaporator case 110 itself may form a storage chamber for storing food therein or may be formed to enclose a separately provided housing (not illustrated).

The evaporator case 110 is provided with a cooling tube 120 through which a refrigerant R for cooling flows and a heating tube 130 through which a working fluid W for defrosting flows. The cooling tube 120 and the heating tube 130 may be formed on at least one surface of the evaporator case 110 and include a cooling flow channel through which the refrigerant R may flow and a heating flow channel through which the working fluid W may flow, respectively.

The cooling tube 120 and the heating tube 130 may be formed in a predetermined pattern on the evaporator case 110 and may be configured not to overlap each other so that the refrigerant R flowing through the cooling tube 120 and the working fluid W flowing through the heating tube 130 may separate flow channels (cooling flow channel heating flow channel), respectively.

In the first embodiment, it is illustrated that the heating tube 130 is formed to surround at least a portion of the cooling tube 120. That is, the cooling tube 120 is formed in the heating flow channel in the form of a loop formed by the heating tube 130. For reference, in the first embodiment, the cooling tube 120 and the heating tube 130 are only illustrated briefly for convenience of explanation, and actually, the components may have various forms.

Figure 4:
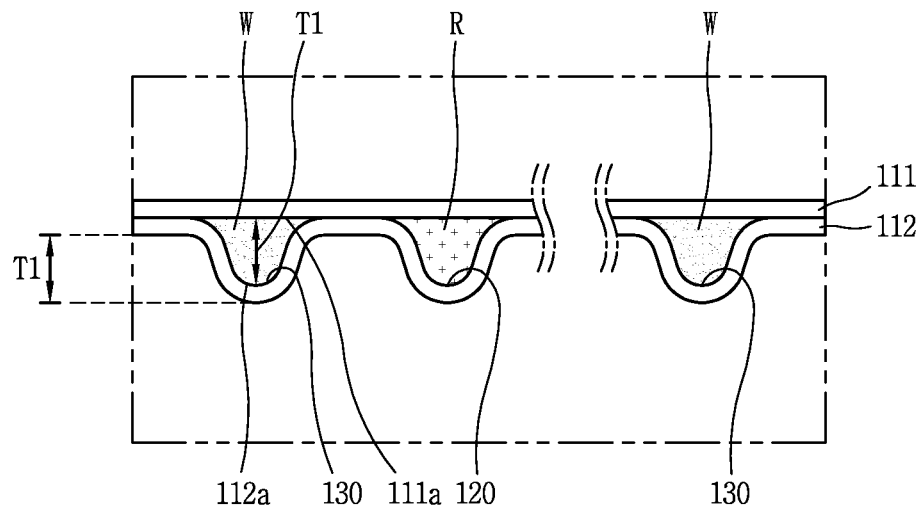
FIG. 4 is a cross-sectional view of the evaporator illustrated in FIG. 2 taken along line A-A.

FIG. 4 is a cross-sectional view of the evaporator 100 illustrated in FIG. 2 taken along line A-A.

In a general roll-bond type evaporator, a portion where a cooling flow channel is formed protrudes to the inside and the outside of the evaporator case. Thus, there is a problem that defrost water does not drain because it is held between the cooling flow channels protruding to the inside of the evaporator case. This leads to a problem that, when the cooling function is operated again, the undrained defrost water is frozen and adhered to food stored inside or gradually increased in volume to degrade heat exchange efficiency of the evaporator.

In order to solve the problems as illustrated in FIG. 4, the first embodiment discloses the evaporator 100 in which the cooling tube 120 and the heating tube 130 protrude to the outside of the evaporator case 110 and an inner surface of the evaporator case 110 is formed to be flat. In FIG. 4, it is illustrated that a flat first case sheet 111 forms the inner surface of the evaporator case 110 and a second case sheet 112 including a curved portion forms an outer surface of the evaporator case 110.

Specifically, each of the cooling tube 120 and the heating tube 130 is configured by a plane portion 111a of any one of the first and second case sheets 111 and 112 and a convex portion 112a of the other sheet. In the first embodiment, each of the cooling flow channel and the heating flow channel is defined as an internal space defined by the plane portion 111a of the first case sheet 111 and the convex portion 112a of the second case sheet 112.

According to the above structure, since the lower surface 110a (specifically, an upper portion of the lower surface) of the evaporator case 110 is formed flat, there is no bent portion where defrost water is held on the lower surface and defrost water may be smoothly drained, unlike the conventional structure.

In addition, in that the inner surface of the evaporator case 110 itself forms a storage chamber for storing food therein, the bent portion of the inner surface of the evaporator case of the conventional structure may make a user feel that it is not neat. However, in the present disclosure, since the inner surface of the evaporator case 110 is formed flat, aesthetics sense that the user may feel may be improved.

Meanwhile, when the first and second case sheets 111 and 112 have a thickness of 0.8 mm, the height T1 of each of the cooling flow channel and the heating flow channel is preferably 1.6 mm or greater and 1.8 mm or smaller. If the height T1 is less than 1.6 mm, the amount of the refrigerant R flowing through the cooling flow channel and the amount of the working liquid W flowing through the heating flow channel are not sufficient for cooling and defrosting the evaporator 100. Also, if the height T1 exceeds 1.8 mm, it was checked that the first and second case sheets 111 and 112 was separated or the second case sheet 112 was broken in the manufacturing method of the evaporator 100.

Since the thickness of the second case sheet 112 is uniformly maintained almost in the entire area, the height T1 may be substantially equal to a height from the one surface of the second case sheet 112 to the top of the convex portion 112a. Thus, in case where the first and second case sheets 111 and 112 are formed of an aluminum plate having a thickness of 0.8 mm, the height from one surface of the second case sheet 112 to the top of the convex portion 112a is preferably 1.6 mm or greater and 1.8 mm or smaller.

Figure 5:
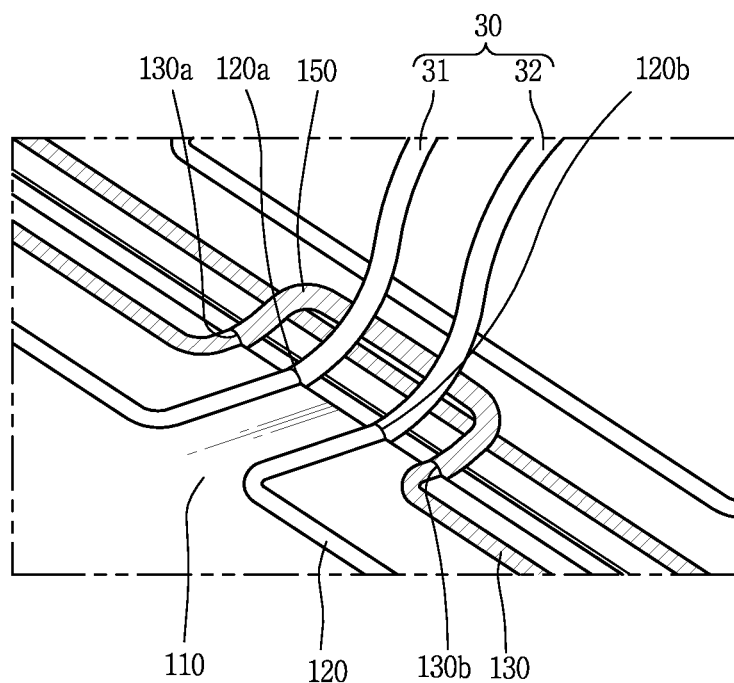
FIG. 5 is an enlarged view of a portion B illustrated in FIG. 2.

FIG. 5 is an enlarged view of a portion B illustrated in FIG. 2.

Referring to FIG. 5, the cooling tube 120 formed in the evaporator case 110 is connected to a condenser and a compressor through an extension pipe 30, whereby a refrigerating cycle is formed. The extension pipe 30 may be connected to the cooling tube 120 by welding.

Specifically, one end (inlet 120a) of the cooling tube 120 is connected to one end 31 of the extension tube 30 and the other end (outlet 120b) of the cooling tube 120 is connected to the other end of the extension tube 30, forming a circulation loop of the refrigerant R. The refrigerant R which has a low temperature and low pressure and is in a liquid state flows in through the one end 120a of the cooling tube 120 and the refrigerant R which is in a gaseous state flows out through the other end 120b of the cooling tube 120.

According to the above structure, the cooling tube 120 is filled with the refrigerant R for cooling, and the evaporator case 110 and ambient air of the evaporator case 110 are cooled according to circulation of the refrigerant R.

In addition, the heating tube 130 formed in the evaporator case 110 is filled with the working fluid W for defrosting. To this end, in the first embodiment, it is illustrated that first and second openings 130a and 130b of the heating tube 130 are exposed to one end portion of the frame. However, the present disclosure is not limited thereto. The first and second openings 130a and 130b of the heating tube 130 may be portions exposed to the outside when a predetermined portion is cut at a specific position of the frame.

The working fluid W is filled in the heating tube 130 through at least one of the first and second openings 130a and 130b and, after the working fluid W is filled, the first and second openings 130a and 130b may communicate with each other through a connection pipe 150.

In the example of FIG. 5, it is illustrated that the first and second openings 130a and 130b of the heating tube 130 are mutually connected by the connection pipe 150, whereby the heating tube 130 forms a closed-loop circulation flow channel with the connection pipe 150 to allow the working fluid W to circulate therealong. The connection pipe 150 may connected to the first and second openings 130a and 130b by welding.

As the working liquid W, a refrigerant (e.g., R-134a, R-134a, etc.) which exists in a liquid phase under a freezing condition of the refrigerator 1 and which is changed to a gaseous phase to serve to transport heat may be used.

A charging amount of the working liquid W must be appropriately selected in consideration of a heat radiation temperature according to the charging quantity as compared with a total volume of the heating tube 130 and the connection pipe 150. According to experimental results, it is preferable that the working fluid W is filled with 80% or greater and less than 100% of the total volume of the heating tube 130 and the connection pipe 150 with respect to a liquid state. If the working fluid W is filled with less than 80%, the heating tube 130 may overheated, and if the working fluid W is filled with 100%, the working fluid W may not circulate smoothly.

Referring back to FIG. 3, the heater 140 is adhered to an outer surface of the evaporator case 110 corresponding to the heating tube 130 to heat the working liquid W in the heating tube 130. In the first embodiment, it is illustrated that the heater 140 is adhered to a lower portion of the lower surface 110a of the evaporator case 110 to cover the chamber 131.

The heater 140 is electrically connected to a controller (not illustrated) and generate heat when a driving signal is received from the controller. For example, the controller may apply a driving signal to the heater 140 at predetermined time intervals or may apply a driving signal to the heater 140 when a temperature sensed by a temperature sensor (not illustrated) is lower than a set temperature or humidity sensed by a humidity sensor (not illustrated) is higher than set humidity.

Hereinafter, the defrosting-related structure of the evaporator 100 will be described in more detail.

Figure 6:
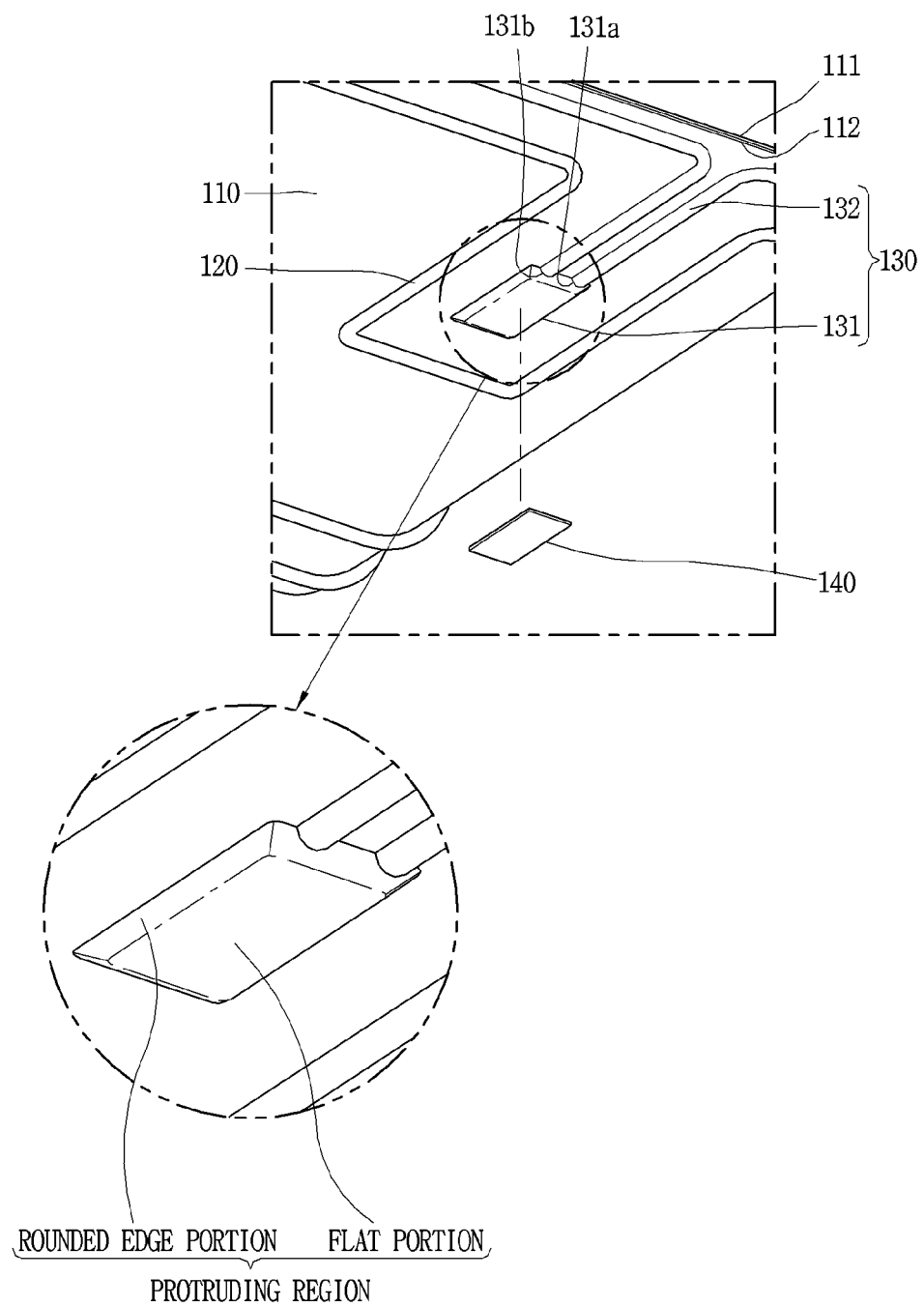
FIG. 6 is an enlarged view of a portion C illustrated in FIG. 3.

FIG. 6 is an enlarged view of a portion C illustrated in FIG. 3.

Referring to FIG. 6, the heating tube 130 is formed in a predetermined pattern in the evaporator case 110 not to overlap the cooling tube 120, and the inside of the heating tube 130 is filled with the working liquid W for defrosting. The heating tube 130 includes a chamber 131 and a flow pipe 132.

The chamber 131 has a predetermined area so that a predetermined amount of the working liquid W may stay therein. The heater 140 is attached to the chamber 131 to heat the working liquid W therein.

As described above, the chamber 131, which is a component of the heating tube 130, is formed by the plane portion 111a of the first case sheet 111 forming the inner surface of the evaporator case 110 and the convex portion 112a of the second case sheet 112 forming an outer surface of the evaporator case 110. That is, the internal space of the chamber 131 is defined as an internal space defined by the plane portion 111a of the first case sheet 111 and the convex portion 112a of the second case sheet 112.

The chamber 131 has an outlet 131a through which the working fluid W heated by the heater 140 is discharged and an inlet 131b through which the working fluid W cooled while flowing in the flow pipe 132 is collected. A sectional area of the outlet 131a may be equal to or greater than a sectional area of the inlet 131b. Accordingly, the heated working fluid W may be smoothly discharged to the flow pipe 132 through the outlet 131a and introduction (back-flow) the heated working fluid W to the flow pipe 132 through the inlet 131b may be prevented to a certain level.

The chamber 131 may be formed at a lower portion of the evaporator case 110. For example, as illustrated, the chamber 131 may be formed on a lower surface 110a of the evaporator case 110. In another example, the chamber 131 may be formed at a lower portion of the left side surface 110b of the evaporator case 110 or at a lower portion of the right side surface 110b".

For reference, since the heater 140 as a heat source is arranged to correspond to the chamber 131, the chamber 131 has the highest temperature in the heating tube 130. Therefore, when the chamber 131 is formed on the lower surface 110a of the evaporator case 110 as in the above example, frost deposited on the evaporator 100 may be effectively removed by convection lift due to heat and heat transfer to the left and right side surfaces 110b' and 110b" of the evaporator case 110.

In order to effectively use high temperature heat at the heater 140 and the chamber 131, the chamber 131 may be formed at a position spaced inwards from the edge of the evaporator case 110. Alternatively, the chamber 131 may extend inwards toward the cooling tube 120 formed in the loop-shaped heating flow channel.

The flow pipe 132 is connected to the outlet 131a and the inlet 131b of the chamber 131 to form a heating flow channel through which the working fluid W flows.

Like the chamber 131, the flow pipe 132 is formed by the plane portion 111a of the first case sheet 111 forming the inner surface of the evaporator case 110 and the convex portion 112a of the second case sheet 112 forming the outer surface of the evaporator case 110. That is, the internal space of the flow pipe 132 is defined as an internal space defined by the plane portion 111a of the first case sheet 111 and the convex portion 112a of the second case sheet 112.

For reference, the description related to the height T1 of the heating flow channel may also be applied in the same manner to the description in relation to the height of the chamber 131 and the flow pipe 132 in that the chamber 131 and the flow pipe 132 are components of the heating flow channel. Therefore, when the first and second case sheets 111 and 112 are formed of an aluminum plate having a thickness of 0.8 mm, the height T2 of the internal space of the chamber 131 and the flow pipe 132 may be 1.6 mm to 1.8 mm.

Meanwhile, the flow pipe 132 connected to the outlet 131a may extend toward an upper side of the evaporator case 110 to form a circulating flow by a lifting force of the heated working fluid W.

Referring to FIGS. 2 and 3, both end portions of the flow pipe 132 are connected to the outlet 131a and the inlet 131b of the chamber 131, respectively, and the flow pipe 132 extending from the outlet 131a extends to one side surface among the left and right side surfaces 110b' and 110b" of the evaporator case 110 and extends toward the upper surface 110c of the evaporator case 110. Here, the flow pipe 132 extending from the outlet 132b may also extend to the other surface among the left and right side surfaces 110b' and 110b" and extend toward the upper surface 110c of the evaporator case 110.

Here, as illustrated, when a distance for the flow pipe 132 extending from the outlet 131a to reach one side surface among the left and right side surfaces 110b' and 110b" of the evaporator case 110 is shorter than a distance for the flow pipe 132 extending from the inlet 131b to reach the other side surface among the left and right side surfaces 110b' and 110b" of the evaporator case 110, the heated working fluid W flows to the flow pipe 132 extending from the outlet 131a. Accordingly, the working fluid W heated by the heater 140 is discharged from the outlet 131a of the chamber 131 and flows along the flow pipe 132 to transfer heat to the evaporator case 110, and the working fluid W cooled during this process flows in to the inlet 131b, is re-heated by the heater 140, and is discharged from the outlet 131a, forming a circulation flow.

The flow pipe 132 may be formed to enclose at least a portion of the cooling tube 120 formed in the evaporator case 110, and accordingly, it may extend along the inner circumference of the evaporator case 110.

In the first embodiment, the chamber 131 is formed on the lower surface 110a of the evaporator case 110 and the flow pipe 132 extending from the outlet 131a extends to one side surface (right side surface 110b" in the drawing) of the evaporator case 110 and extends toward the upper surface (right side surface 110c" in the drawing) of the evaporator case 110. The working fluid W heated by the heater 140 is lifted along the heating flow channel by a lifting force.

Thereafter, the flow pipe 132 passing through the one side surface 110a extends to the other side surface (left side surface 110b' in the drawing) of the evaporator case 110, extends toward the upper surface (left side upper surface 110c' in the drawing) of the evaporator case 110, passes through the other side surface, and extends to the lower surface 110a to be finally connected to the inlet 131b of the chamber 131.

In the drawing, the cooling tube 120 is disposed between the flow pipe 132 formed at the front of the evaporator case 110 and the flow pipe 132 formed at the rear of the evaporator case 110, and a flow direction of the working fluid W flowing through the flow pipe 132 formed at the front and a flow direction of the working fluid W flowing through the flow pipe 132 formed at the rear are opposite to each other.

The heater 140 is attached to the outer surface of the evaporator case 110 corresponding to the chamber 131 and is configured to heat the working liquid W in the heating tube 130. The heater 140 may be formed in a plate-like shape, and typically, a plate-shaped ceramic heater 140 may be used.

Figure 7:
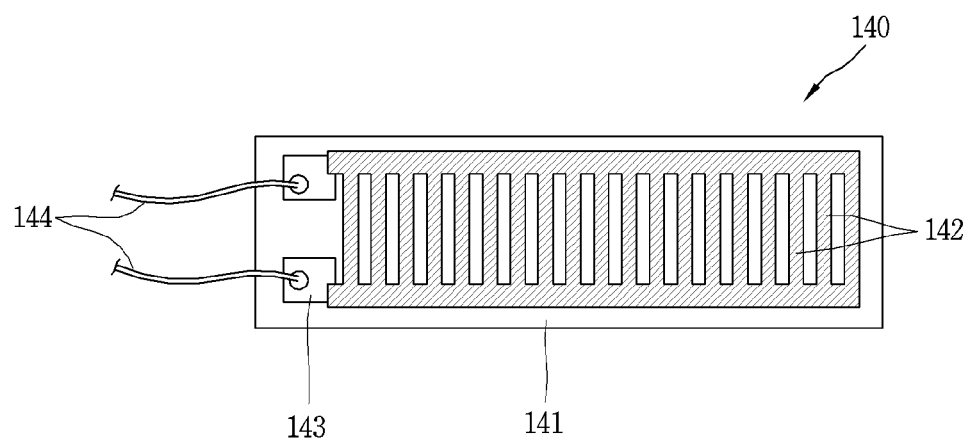
FIG. 7 is a conceptual view illustrating an example of a heater illustrated in FIG. 6.

FIG. 7 is a conceptual view illustrating an example of the heater 140 illustrated in FIG. 6.

Referring to FIG. 7, the heater 140 includes a base plate 141, a hot wire 142, and a terminal 143.

The base plate 141 is formed in a plate-like shape and attached to the chamber 131. The base plate 141 may be formed of a ceramic material.

The hot wire 142 is formed on the base plate 141. The hot wire 142 generates heat when a driving signal is received from a controller. The hot wire 142 may be formed by patterning a resistor (e.g., a powder formed by combining ruthenium and platinum, tungsten, etc.) on the base plate 141 in a specific pattern.

The terminal 143 electrically connected to the hot wire 142 is provided on one side of the base plate 141, and a lead wire 144 electrically connected to the controller is connected to the terminal 143.

According to the configuration, when a driving signal is generated by the controller, the driving signal is transferred to the heater 140 through the lead wire 144, and the hot wire 142 of the heater 140 is heated according to power application. Heat generated by the heater 140 is transferred to the chamber 131, whereby the working liquid W in the chamber 131 is heated to a high temperature.

Meanwhile, a thermally conductive adhesive (not illustrated) may be interposed between the chamber 131 and the heater 140 (specifically, between the chamber 131 and the base plate 141). By the thermally conductive adhesive, the heater 140 may be more firmly fixed to the evaporator case 110 and heat transfer from the heater 140 to the chamber 131 may be increased.

Since the heater 140 is installed in the evaporator 100, defrost water generated due to defrosting may be introduced to the heater 140 in terms of structure. Since the heater 140 included in the heater 140 is an electronic component, a short circuit may occur when defrost water comes into contact with the heater 140. Thus, in order to prevent moisture including defrost water from penetrating into the heater 140, a sealing member (not illustrated) for covering and sealing the heater 140 may be provided.

An insulating material (not illustrated) may be interposed between a rear surface of the heater 140 and the sealing member. A mica sheet formed of mica may be used as the insulating material. Since the insulating material is disposed on the rear surface of the heater 140, heat transfer to the rear side of the heater 140 may be restricted when the hot wire 142 generates heat according to power application. Therefore, melting of the sealing member due to heat transfer may be prevented.

For reference, water, i.e., defrost water, removed by the defrosting device flows into a guide tray (not illustrated) below the evaporator 100 and finally flows to a defrost water trap (not illustrated) at a lower portion of the refrigerator 1 through a defrost water discharge pipe (not illustrated).

Figure 8:
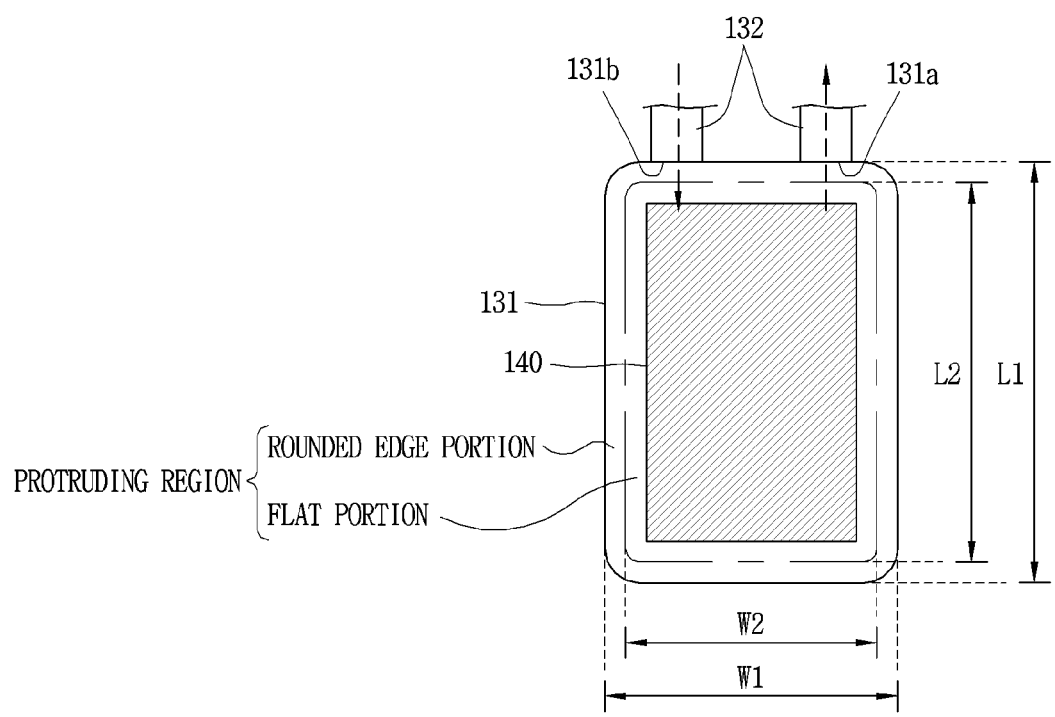
FIG. 8 is a conceptual view illustrating a state in which a heater is mounted on a chamber in FIG. 6.

FIG. 8 is a conceptual view illustrating a state in which the heater 140 is mounted on the chamber 131 in FIG. 6.

As described above, a plate-shaped ceramic heater may be used as the heater 140. Such a plate-like ceramic heater may have a size of 8 mm (width)×45 mm (length) or 8 mm (width)×65 mm (length). In this case, with respect to a case where the evaporator 100 is viewed from the outside, the protruding region [W1 (width)×L1 (length)] where the chamber 131 is formed may have a width W1 of 10 mm to 12 mm and a length L1 of 47 mm to 80 mm.

In the protruding region where the chamber 131 is formed, a thickness of the rounded edge portion is approximately 1 mm, and thus, the protruding region may have a length and a width obtained by adding a thickness of 2 mm at both sides of the rounded edge portion to a length and a width of the heater 140, at the least.

Therefore, in order for the heater 140 to be completely in contact with a flat portion [W2 (width)×L2 (length)) of the protruding region, the protruding region may be set to a width of 10 mm or greater and a length of 47 mm or greater.

In a state in which the length of the protruding region is set to 47 mm or greater, if the width exceeds 12 mm, the first and second case sheets 111 and 112 may be separated or the second case sheet 112 may be broken in the process of forming the cooling tube 120 and the heating tube 130. Also, if the length of the protruding region exceeds 80 mm, the first and second case sheets 111 and 112 may be separated or the second case sheet 112 may be broken in the process of forming the cooling tube 120 and the heating tube 130.

Therefore, it is preferable that the protruding region is set to a width of 10 mm or greater and 12 mm or less and a length of 47 mm or greater and 80 mm or less.

Figure 9:
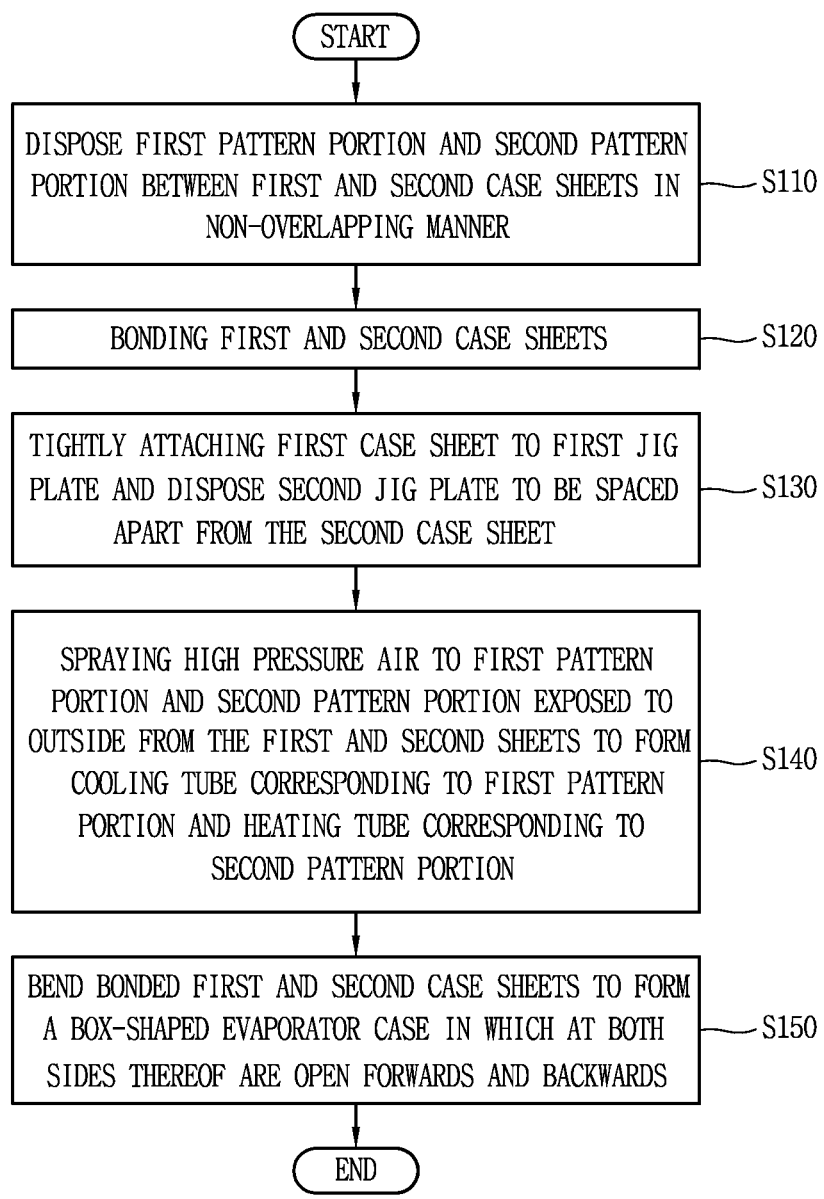
FIG. 9 is a flowchart for explaining a method of manufacturing the evaporator of the first embodiment.
Figure 10:
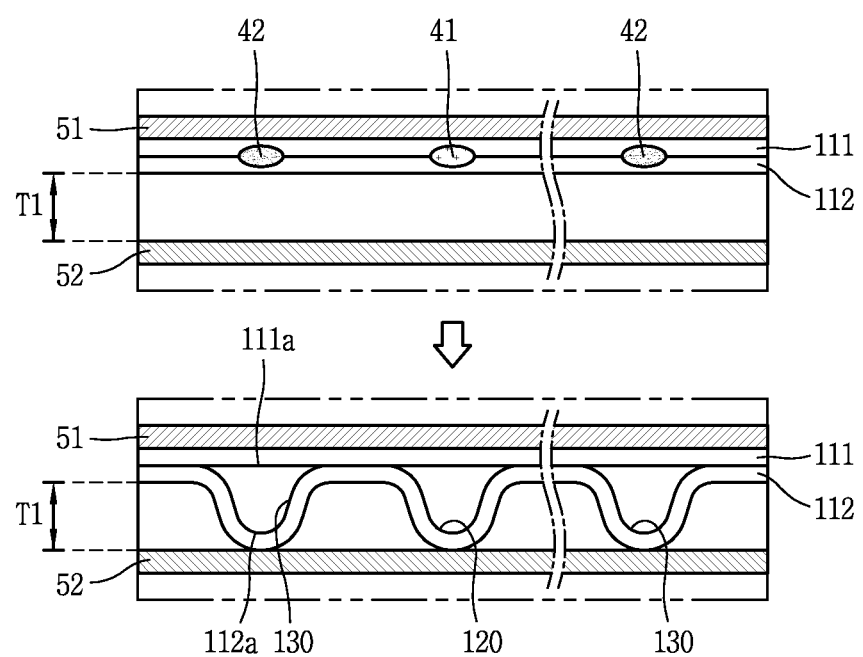
FIG. 10 is a conceptual view illustrating a process of forming a cooling tube and a heating tube using first and second jig plates.

FIG. 9 is a flowchart for explaining a method for manufacturing the evaporator 100 of the first embodiment, and FIG. 10 is a conceptual view illustrating a process of forming the cooling tube 120 and the heating tube 120 using first and second jig plates 51 and 52.

Referring to these drawings together with the above drawings, the first case sheet 111 and the second case sheet 112 constituting the evaporator case 110 are prepared. The first and second case sheets 111 and 112 may be formed of a metal material (e.g., aluminum, steel, etc.) and a coating layer may be formed on surfaces of the first and second case sheets 111 and 112 to prevent corrosion due to contact with moisture. The first and second case sheets 111 and 112 may have the same thickness and rigidity. For example, an aluminum plate having a thickness of 0.8 mm may be used as the first and second case sheets 111 and 112.

A first pattern part 41 corresponding to the cooling tube 120 and a second pattern part 42 corresponding to the heating tube 130 are formed on any one of the first and second case sheets 111 and 112 such that the first pattern part 41 and the second pattern part 42 does not overlap each other. For example, any one of the first and second pattern parts 41 and 42 may be formed to surround the other pattern part. The first and second pattern parts 41 and 42 may be removed later, and graphite, or the like, may be used.

Thereafter, the other of the first and second case sheets 111 and 112 is arranged to cover the first and second pattern parts 41 and 42. As a result, the first and second pattern parts 41 and 42 are interposed between the first and second case sheets 111 and 112 (S110).

Next, the first and second case sheets 111 and 112 are bonded to each other (S120). For example, a method of bringing the first and second case sheets 111 and 112 into contact with each other with the first and second pattern parts 41 and 42 interposed therebetween and compressing the first and second case sheets 111 and 112 using a roller device to integrate them may be used (hot press bonding). Then, a plate-shaped frame integrating the first and second case sheets 111 and 112 is formed, in which the first and second pattern parts 41 and 42 are positioned.

Next, the first jig plate 51 and the second jig plate 52 are disposed on both sides of the plate-shaped frame. Specifically, the first case sheet 111 is brought into close contact with the first jig plate 51, and the second jig plate 52 is disposed to be spaced apart from the second case sheet 112 (S130).

The first jig plate 51 is formed in a flat plate-like shape and the first case sheet 111 may be tightly attached and fixed to one surface (a surface opposite a surface to which the second case sheet 112 is bonded) thereof. The second jig plate 52 is disposed to be spaced apart from the second case sheet 112 by a predetermined interval T1. A size of the cooling tube 120 and the heating tube 130 is determined according to the interval T1. Thus, as described above in relation to FIG. 4, when a thickness of the second case sheet 112 is 0.8 mm, a distance between the second case sheet 112 and the second jig plate 52 is 1.6 mm or greater and does not exceed 1.8 mm.

Next, high-pressure air is sprayed to the first and second pattern parts 41 and 42 exposed to the outside from the mutually bonded first and second case sheets 111 and 112 to form the cooling tube 120 corresponding to the first pattern part 41 and the heating tube 130 corresponding to the second pattern part 42 (S140).

The first and second pattern parts 41 and 42 existing between the first and second case sheets 111 and 112 are discharged from the frame by the sprayed high-pressure air. During this process, the space in which the first pattern part 41 was present is left as an empty space to form the cooling tube 120, and the space in which the second pattern part 42 was present is left as an empty space to form the heating tube 130.

During the process of discharging the first and second pattern parts 41 and 42 by spraying the high-pressure air, the portions where the first and second pattern parts 41 and 42 were present expand to be larger than the volume of the first and second pattern parts 41 and 42.

Here, since the first case sheet 111 is in tight contact with the first jig plate 51, the first case sheet 111 remains flat without being deformed and the second case sheet 112 is deformed convexly. That is, the portions where the first and second pattern parts 41 and 42 were present in the second case sheet 112 expand to form a convex portion 112a, and the convex portion 112a forms the cooling tube 120 and the heating tube 130 together with the plane portion 111a of the first case sheet 111. The degree of expansion of the second case sheet 112, specifically the degree of protrusion of the convex portion 112a, is limited by the distance T1 of the second jig plate 52 relative to the second case sheet 112.

Thereafter, the plate-shaped frame including the cooling tube 120 and the heating tube 130 is bent to fabricate the evaporator case 110 in the form of an empty box that is opened forwards and backwards (S150). By bending the frame, the cooling tube 120 and the heating tube 130 are formed to enclose the evaporator cases 110 and 210.

Thereafter, the cooling tube 120 formed in the evaporator case 110 is connected to the extension pipe 30 so that the refrigerant R may circulate through the cooling tube 120. By this connection, the evaporator 100 is connected to a condenser and a compressor to constitute a refrigerating cycle.

The actuating liquid W is filled in the heating tube 130 through at least one of the first and second openings 130a and 130b of the heating tube 130, and the connection pipe 150 is connected to each of the first and second openings 130a and 130b. Accordingly, the heating tube 130 and the connection pipe 150 form a circulation flow channel in the form of a closed loop in which the working fluid W circulates.

In this manner, in these embodiments, the manufacturing methods of the cooling tube 120 and the heating tube 130 are substantially the same and the manufacturing process of the cooling tube 120 and the heating tube 130 is performed in the same manner as described above, the evaporator 100 equipped with the heating tube 130 may be mass-produced.

Figure 11:
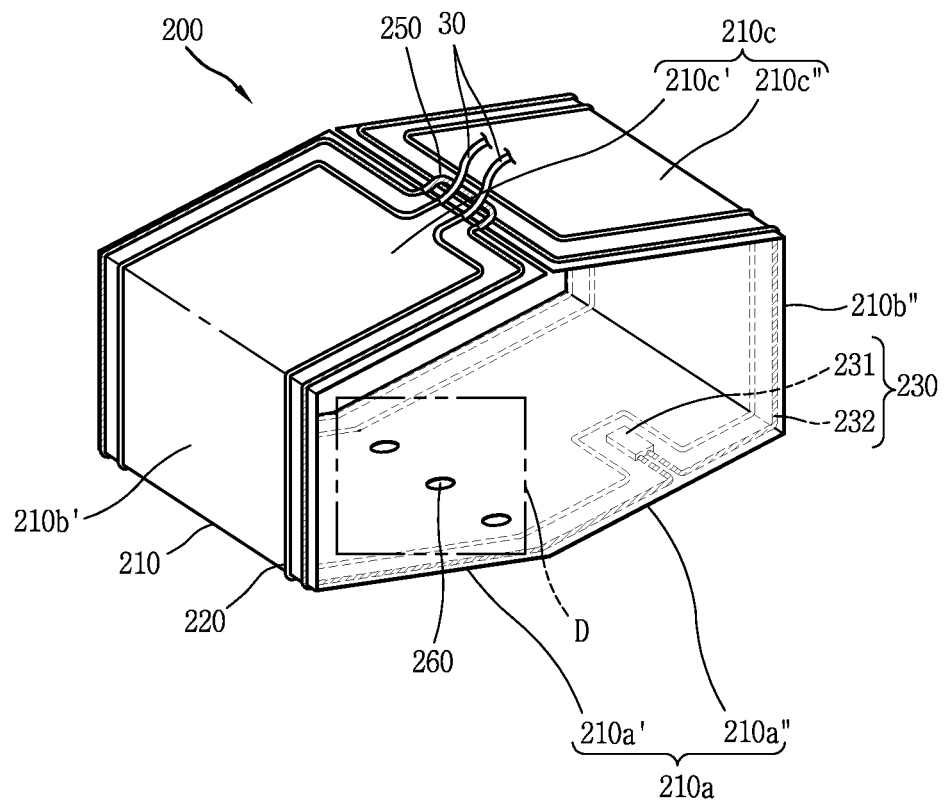
FIG. 11 is a conceptual view illustrating a first modification of the first embodiment.

FIG. 11 is a conceptual view illustrating a first modification of the first embodiment.

Referring to FIG. 11, the first modification differs from the first embodiment only in that at least one of a lower surface 210a and an upper surface 210c of an evaporator case 210 is formed not to be flat but to be sloped. The structure in which the inner surface of the evaporator case 110 disclosed in the first embodiment is flat and the cooling tube 120 and the heating tube 130 protrude to the outside of the evaporator case 110 is also applied to the first modification as is.

At least one of the lower surface 210a and the upper surface 210c of the evaporator case 210 includes first sloped portions 210a' and 210c' and second sloped portions 210a" and 210c". The first sloped portions 210a' and 210c' are sloped at an obtuse angle with respect to the left side surface 210b' and the second sloped portions 210a" and 210c" are sloped at an obtuse angle with respect to the right side surface 210b". The second sloped portions 210a" and 210c" may be connected to the first sloped portions 210a' and 210c' at an obtuse angle.

In the first modification, it is illustrated that the first and second sloped portions 210a', 210a", 210c', 210c" are formed on both lower surface 210a and upper surface 210c of the evaporator case 210. Accordingly, when viewed from the front side, the evaporator case 210 has a hexagonal shape.

Specifically, the lower surface 210a of the evaporator case 210 includes the first sloped portion 210a' and the second sloped portion 210a" which are formed to be sloped downward toward the inside facing each other. The left side upper surface (i.e., the first sloped portion 210c') of the evaporator case 210 extends upward from the left side surface 210b' and the right side upper surface (i.e., the second sloped portion 210c") extends upward from the right side surface 210b". Here, an end portion of the left side upper surface 210c' and an end portion of the right side upper surface 210c" may be disposed to face each other.

In the related art, since the upper surface of the evaporator case is formed flat, defrost water generated on the upper surface drops directly to the lower surface, which affects stored food. Further, since the lower surface of the evaporator case is formed flat, a portion of defrost water may not be drained but spread over an upper portion of the lower and frozen when the cooling function is operated again.

However, according to the above structure, since defrost water generated on the upper surface 210c of the evaporator case 210 flows to the left side surface 210b' and the right side surface 210b" along the first and second sloped portions 210c' and 210c" of the upper surface 210c, the problem that defrost water directly drops to the lower surface 210a may be solved. Also, since defrost water flows along the first and second sloped portions 210a' and 210a" of the lower surface 210a of the evaporator case 210 and gather to a connection portion, the defrost water may be drained smoothly.

A width of the first sloped portion 210a' and a width of the second sloped portion 210a" may be set to be equal to each other. That is, the connection portion of the first and second sloped portions 210a' and 210a" may be positioned at a point corresponding to ½ of the overall width of the evaporator case 210. The connection portion may be formed to extend along a front-rear direction of the evaporator case 210.

In this case, a chamber 231 may be formed on one side of the connection portion, that is, on any one of the first and second sloped portions 210a' and 210a". In this case, a length of a flow pipe 232 extending from an outlet of the chamber 231 to reach one side surface adjacent to any one of the sloped portions to form a circulation flow of the working liquid W may be shorter than a length of the flow pipe 232 extending from an inlet of the chamber 231 to reach the other side surface adjacent to the other sloped portion.

In addition, angles at which the first and second sloped portions 210a' and 210a" are formed on the lower surface 210a of the evaporator case 210 are sloped with respect to the left side surface 210b' and the right side surface 210b" may range from 93° to 95°. This means that, compared with the first embodiment in which the lower surface 110a of the evaporator case 110 is flat, it is preferred that the first and second sloped portions 210a' and 210a" are sloped at an angle of 3° to 5° with respect to the flat lower surface 110a.

If the angle is less than 3°, there is a problem that defrost water may not easily flow along the first and second sloped portions 210a' and 210a". In addition, if the angle exceeds 5°, there is a problem that the food slides along the first and second sloped portions 210a' and 210a" and the first and second sloped portions 210a' and 210a" may become excessively apparent to negatively affect an aesthetic sense the user may feel.

Figure 12:
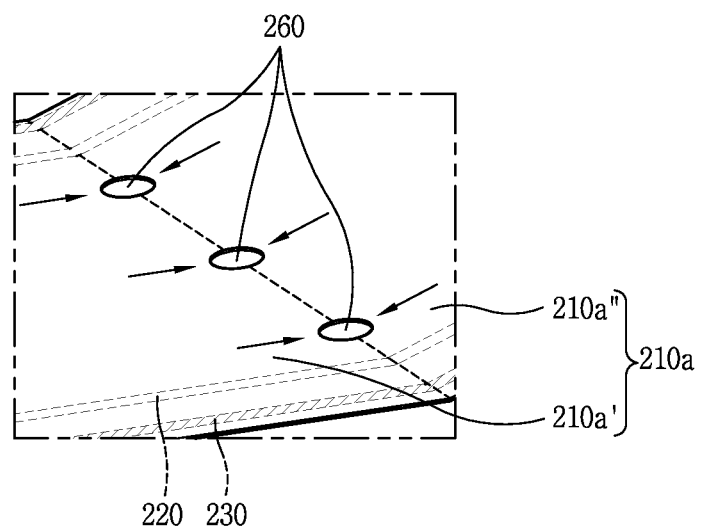
FIG. 12 is an enlarged view of a portion D illustrated in FIG. 11.

FIG. 12 is an enlarged view of a portion D of FIG. 11.

Referring to FIG. 12, a drain hole 260 may be formed at a connection portion between the first sloped portion 210a' and the second sloped portion 210a" formed on the lower surface of the evaporator case 210. The drain hole 260 may communicate with a guide tray provided at a lower portion of the evaporator 200.

The drain hole 260 may be provided in plurality, and the plurality of drain holes 260 may be disposed to be spaced apart from each other at a predetermined interval along the connection portion, i.e., in a front-rear direction of the evaporator case 210.

Since the drain holes 260 are formed at the connection portion, defrost water may be smoothly drained.

Figure 13:
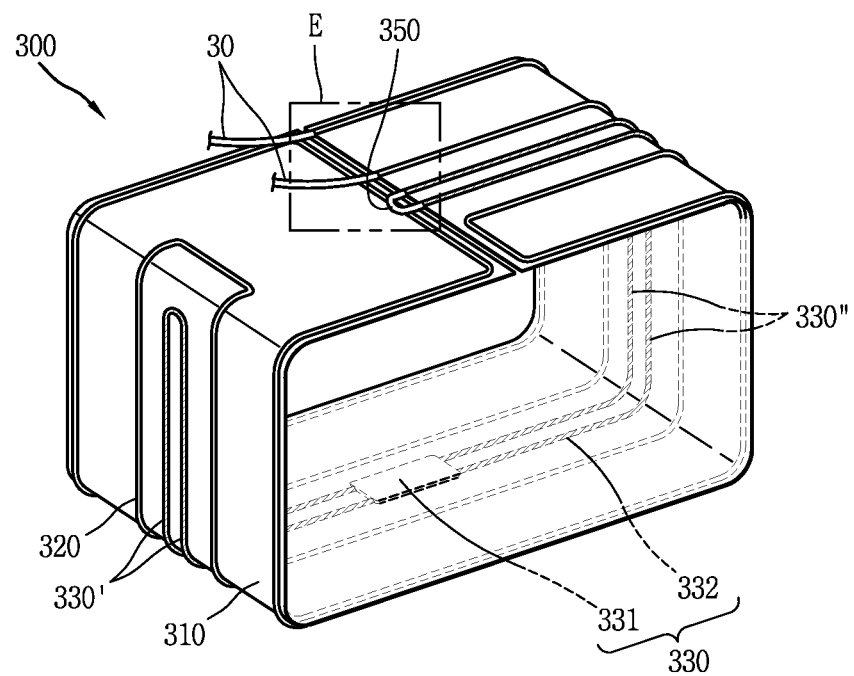
FIGS. 13 and 14 are conceptual views of a second modification of the first embodiment viewed from different directions.
Figure 14:
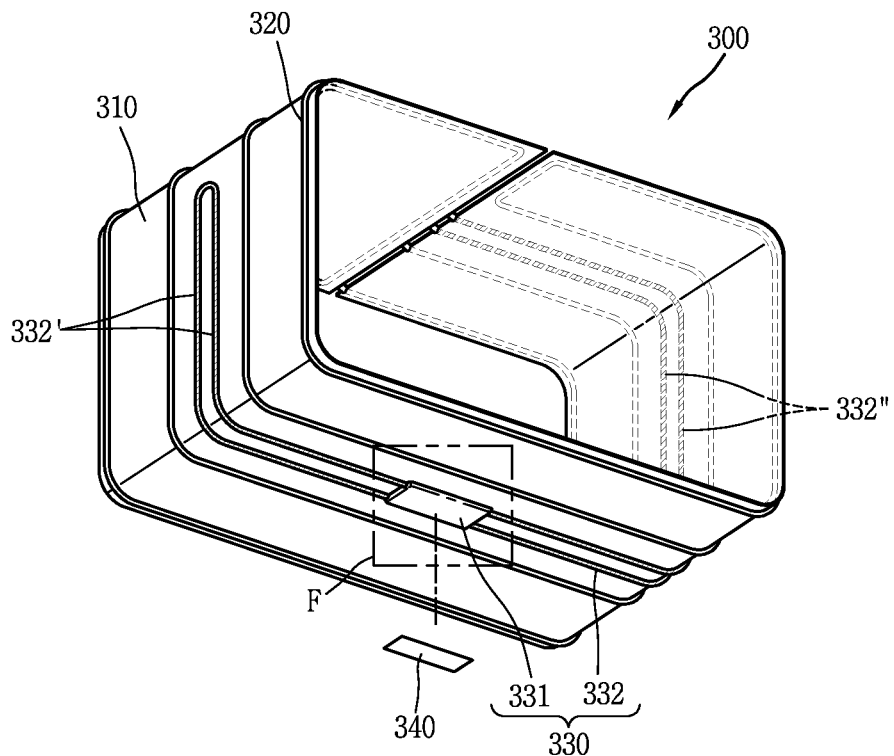
Figure 15:
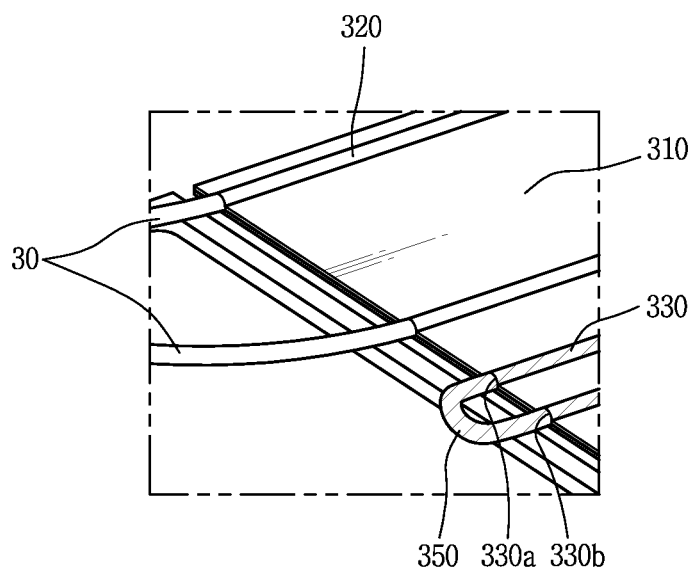
FIG. 15 is an enlarged view of a portion E illustrated in FIG. 13.
Figure 16:
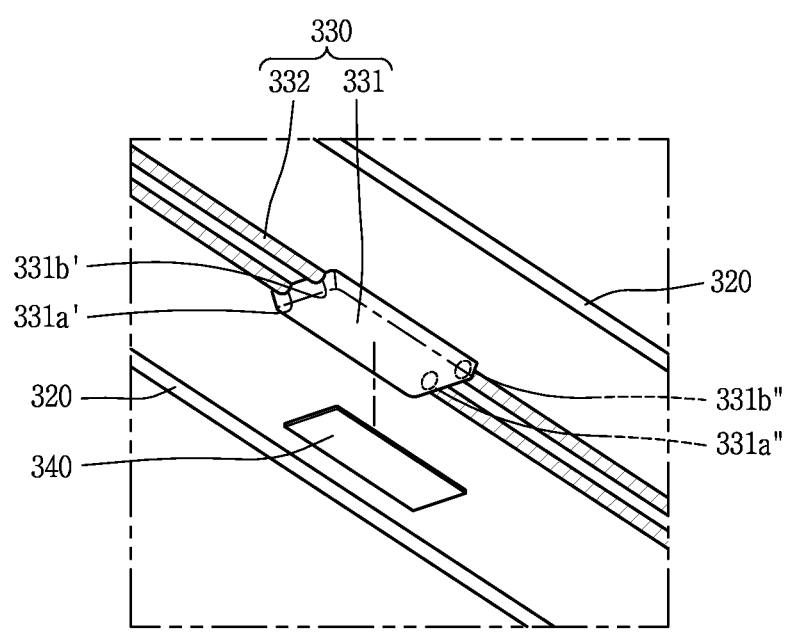
FIG. 16 is an enlarged view of a portion F illustrated in FIG. 14.
Figure 17:
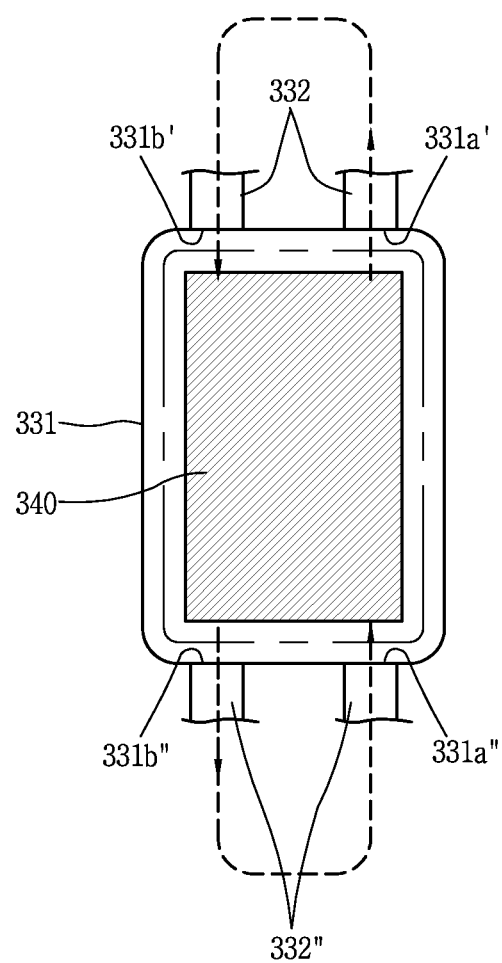
FIG. 17 is a conceptual view for explaining first and second heating flow channels illustrated in FIG. 13.

FIGS. 13 and 14 are conceptual views of a second modification of the first embodiment, viewed in different directions, FIG. 15 is an enlarged view of a portion E illustrated in FIG. 13, FIG. 16 is an enlarged view of a portion F illustrated in FIG. 14, and FIG. 17 is a conceptual view for explaining the first and second heating flow channels 332' and 332" illustrated in FIG. 13.

Referring to FIGS. 13 to 17, the second modification differs from the first embodiment only in that formation positions of the cooling tube 320 and the heating tube 330 are opposite to those of the first embodiment. The structure in which the inner surface of the evaporator case 110 is flat and the cooling tube 120 and the heating tube 130 protrude to the outside of the evaporator case 110 disclosed in the first embodiment is applied as is to the second modification.

A cooling tube 320 is formed in a predetermined pattern in the case 310 and the inside of the cooling tube 320 is filled with a refrigerant R for cooling. The heating tube 330 is formed in a predetermined pattern in the case 310 so as not to overlap with the cooling tube 320 and the inside of the heating tube 330 is filled with the working liquid W for defrosting.

In the evaporator 300 of the second modification, formation positions of the cooling tube 320 and the heating tube 330 are opposite to those of the first embodiment. As illustrated, the cooling tube 320 is configured to enclose at least a portion of the heating tube 330. That is, the heating tube 330 is formed in a loop-shaped cooling flow channel formed by the cooling tube 320.

A heater 340 is attached to an outer surface of the case 310 corresponding to the heating tube 330 to heat the working fluid W in the heating tube 330. In the second modification, the heater 340 is adhered to a lower portion of the lower surface of the case 310 to cover the chamber 331 and heat the working liquid W in the chamber 331.

As described above in the first embodiment, the heating tube 330 includes a chamber 331 and a flow pipe 332. The chamber 331 is formed at a position spaced apart inwards from an edge portion of the case 310, and a cooling tube 320 is disposed at both sides. In order to effectively utilize high temperature heat generated by the heater 340, the chamber 331 may be disposed at a central portion of the lower surface of the case 310.

The flow pipe 332 may extend along at least one surface of the case 310. In the second modification, it is illustrated that the flow pipe 332 extends from the lower surface of the case 310 to both right and left sides. The flow pipe 332 may extend to an upper surface of the case 310 as well. Here, first and second openings 330a and 330b may be formed in the flow pipe 332 extending to the upper surface, and the first and second openings 330a and 330b may be connected by a connection member 350 as described above in the first embodiment.

The flow pipe 332 is connected to an inlet and an outlet of the chamber 331 so that a heating flow channel through which a high temperature working fluid W discharged from the chamber 331 flows and through which a cooled working fluid W flows into the chamber 331.

As in the first embodiment, the chamber 331 may have one outlet and one inlet, and both end portions of the flow pipe 332 are connected to the outlet and the inlet, respectively, to form single flow channel for circulation of the working fluid W.

Alternatively, as in the second modification, a first outlet 331a' and a second outlet 331a" may be provided on both sides of the chamber 331, respectively, and a first inlet 331b' and a second inlet 331b' may be provided on both sides of the chamber 331, respectively. That is, the first outlet 331a' and the first inlet 331b' may be provided on one side of the chamber 331, and the second outlet 331a' and the second inlet 331b' may be provided on the other side of the chamber 331.

In the above structure, the flow pipe 332 includes a first heating flow channel 332' allowing the working fluid W to be discharged from the first outlet 331a' and recovered to the first inlet 331b' and a second heating flow channel 332" allowing the working fluid W to be discharged to the second outlet 331" and recovered to the second inlet 331b".

One portion of the flow pipe 332 is connected to the first outlet 331a', extends to one side of the case 310 so as to be away from the chamber 331, and extends to become close to the chamber 331 so as to be connected to the first inlet 331b'. One portion of the flow pipe 332 forms the first heating flow channel 332'. In addition, the other portion of the flow pipe 332 is connected to the second outlet 331", extends to the other side of the case 310 so as to become away from the chamber 331, and extends to become closer to the chamber 331 so as to be connected to the second inlet 331b". The other portion of the flow pipe 332 forms the second heating flow channel 332".

In the above, regarding the evaporators 100, 200, and 300 of the present disclosure in which the cooling tubes 120, 220, 320, and the heating tubes 130, 230, and 330 are formed as a roll bond type in the evaporator cases 110, 210, and 310, the structure in which the heating tubes 130 and 230 enclose the cooling tubes 120 and 220 (first embodiment and first modification) and the structure in which the cooling tube 320 enclose the heating tube 330 (second modification) have been described as examples. However, the present disclosure is not necessarily limited to the above examples. The cooling tubes may be formed on one side of the evaporator case, the heating tubes may be formed on the other side of the evaporator case, and various other types of modified structures may be considered.

Also, the structure in which at least one of the lower surface 210a and the upper surface 210c of the evaporator case 210 has the first sloped portions 210a' and 210" and the second sloped portions 210c' and 210c''' as described in the first modification may also be applied to the second modification.

Figure 18:
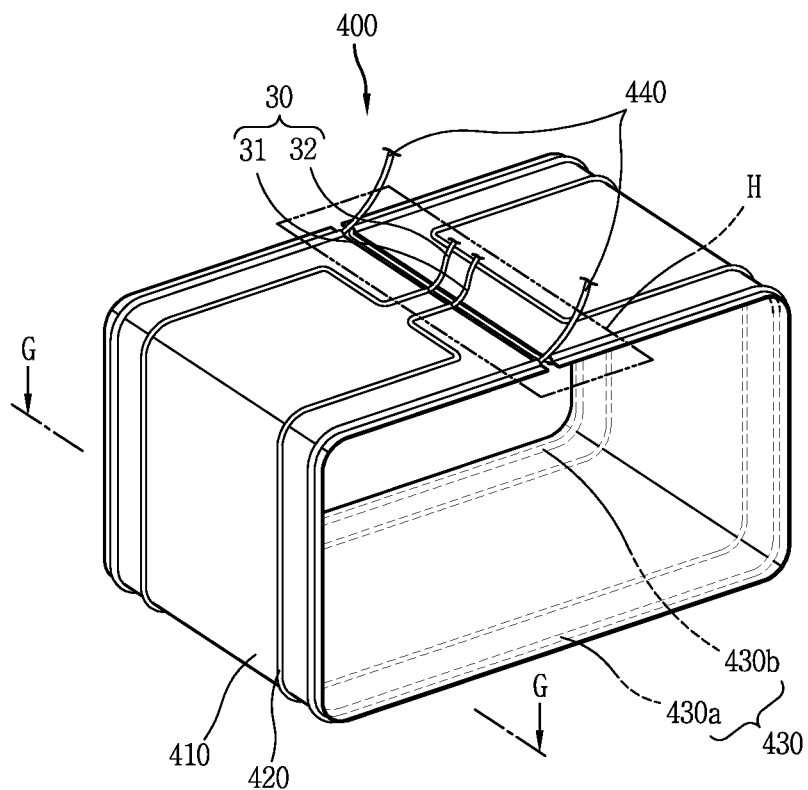
FIG. 18 is a conceptual view illustrating a second embodiment of an evaporator applied to the refrigerator of FIG. 1.
Figure 19:
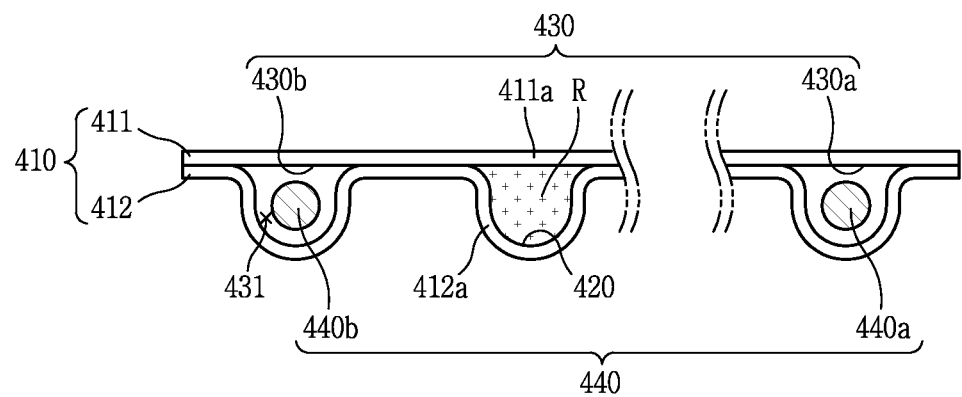
FIG. 19 is a cross-sectional view of the evaporator illustrated in FIG. 18 taken along line G-G.

FIG. 18 is a conceptual view illustrating a second embodiment of an evaporator 400 applied to the refrigerator 1 of FIG. 1, and FIG. 19 is a cross-sectional view of the evaporator 400 taken along line G-G of FIG. 18.

Referring to FIGS. 18 and 19, compared with the first embodiment in which the heating tube 130 is filled with the working fluid W and the working fluid W is heated by the heater 140, the second embodiment differs from the second embodiment in that a hot wire heater 440 is inserted into the heating tube 430. The structure in which the inner surface of the evaporator case 110 is flat and the cooling tube 120 and the heating tube 130 protrude to the outside of the evaporator case 110 disclosed in the first embodiment is also applied as is to the second embodiment.

The evaporator 400 of the present disclosure includes an evaporator case 410, a cooling tube 420, a heating tube 430, and a hot wire heater 440. Among the components of the evaporator 400, the cooling tube 420 corresponds to a component for cooling and the heating tube 430 and the hot wire heater 440 correspond to components for defrosting.

The evaporator case 410 is formed in an empty box shape to form a storage space for food therein. The evaporator case 410 itself may form a storage space for food therein or may be configured to enclose a separate housing (not illustrated) to form a storage space for food.

A cooling tube 420 through which the refrigerant R for cooling flows and a heating tube 430 accommodating a hot wire heater 440 for defrosting are formed in the evaporator case 410. The cooling tube 420 and the heating tube 430 are embedded in at least one surface of the evaporator case 410 to form a cooling flow channel through which the refrigerant R may flow and a heating flow channel in which the hot wire heater 440 is disposed.

Specifically, each of the cooling tube 420 and the heating tube 430 is formed by a plane portion 411a of any one of the first and second case sheets 411 and 412 and a convex portion 412a of the other sheet. In this embodiment, each of the cooling flow channel and the heating flow channel is defined by an internal space limited by the plane portion 411a of the first case sheet 411 and the convex portion 412a of the second case sheet 412.

The cooling tube 420 and the heating tube 430 are formed in a predetermined pattern in the evaporator case 410 and the cooling tube 420 and the heating tube 430 are configured not to overlap each other to respectively form separate flow channels (cooling flow channel and heating flow channel).

In this embodiment, it is illustrated that the heating tube 430 is formed to enclose the cooling tube 420. That is, the cooling tube 420 is formed in the heating flow channel in the form of an open loop formed by the heating tube 430.

The cooling tube 420 formed in the evaporator case 410 is connected to a condenser and a compressor through the extension pipe 30 and a refrigerating cycle is formed by the connection. The extension pipe 30 may be connected to the cooling tube 420 by welding.

Specifically, one end (inlet 420a) of the cooling tube 420 is connected to one end 31 of the extension tube 30 and the other end (outlet 420b) of the cooling tube 420 is connected to the other end of the extension tube 30, forming a circulation loop of the refrigerant R. The refrigerant R which has a low temperature and low pressure and is in a liquid state flows in through the one end 420a of the cooling tube 420 and the refrigerant R which is in a gaseous state flows out through the other end 420b of the cooling tube 420.

According to the above structure, the cooling tube 420 is filled with the refrigerant R for cooling, and the evaporator case 410 and ambient air of the evaporator case 410 are cooled according to circulation of the refrigerant R.

In addition, a hot wire heater 440 for defrosting is inserted into the heating tube 430 formed in the evaporator case 410, and power is applied according to preset conditions to generate heat. For example, the predetermined conditions may be when a predetermined time has lapsed, a case where a temperature sensed by a temperature sensor (not illustrated) is lower than a set temperature, a case where humidity sensed by a humidity sensor (not illustrated) is higher than set humidity, and the like.

The hot wire heater 440 inserted into the heating tube 430 is formed to surround the evaporator case 410. Specifically, the hot wire heater 440 is embedded in the heating tube 430 formed on each side (lower surface, left and right side surfaces, and upper surface) of the evaporator case 410.

In the drawing, it is illustrated that the hot wire heater 440 is formed to surround the front portion and the rear portion of the evaporator case 410. According to this structure, heat generated by the hot wire heater 440 may be transferred to almost the entire area of the evaporator case 410.

As described above, according to the present disclosure, since the cooling tube 420 and the heating tube 430 are formed in the form of a roll-bond type in the evaporator case 410, the refrigerant R is filled in the cooling tube 420, and the hot wire heater 440 is inserted into the heating tube 430, the new evaporator 400 in which the hot wire heater 440 is embedded in the roll bond type evaporator case 410 applied to the direct cooling type refrigerator 4 may be provided. Here, the hot wire heater 440 is driven (turned on/off)

according to predetermined conditions to generate heat. Heat generated in the hot wire heater is transmitted to the evaporator case 410 to melt and remove frost deposited on the evaporator case 410. As described above, according to the present disclosure, a defrosting time is reduced compared to the existing natural defrosting, and thus, freshness of food may be maintained, and cooling efficiency, which has been reduced due to frost, may be increased to reduce power consumption.

In addition, since the hot wire heater 440 is embedded in the evaporator case 410, heat generated by the hot wire heater 440 may be used more effectively for defrosting than the related art structure, and since substantially no space is required for configuring a defrosting device, capacity of the freezing chamber 11 may be maximally secured.

Also, since the manufacturing methods of the cooling tube 420 and the heating tube 430 are substantially the same and a part of the manufacturing process (forming the heating tube 430) may be performed together, the evaporator 400 in which the hot wire heater 440 is embedded may be mass-produced by adding the simple process (inserting the hot wire heater 440 into the heating tube 430).

Also, in the structure in which the cooling tube 420 and the heating tube 430 are formed by mutually bonding the flat first case sheet 411 and the curved second case sheet 412, when the flat first case sheet 411 forms an inner surface of the evaporator case 410, a portion of the inner surface of the evaporator case 410 where defrost water is accumulated is eliminated, and thus, defrost water may be drained smoothly.

Hereinafter, the heating tube 430 and the hot wire heater 440, which are related to defrosting, will be described in more detail.

Figure 20:
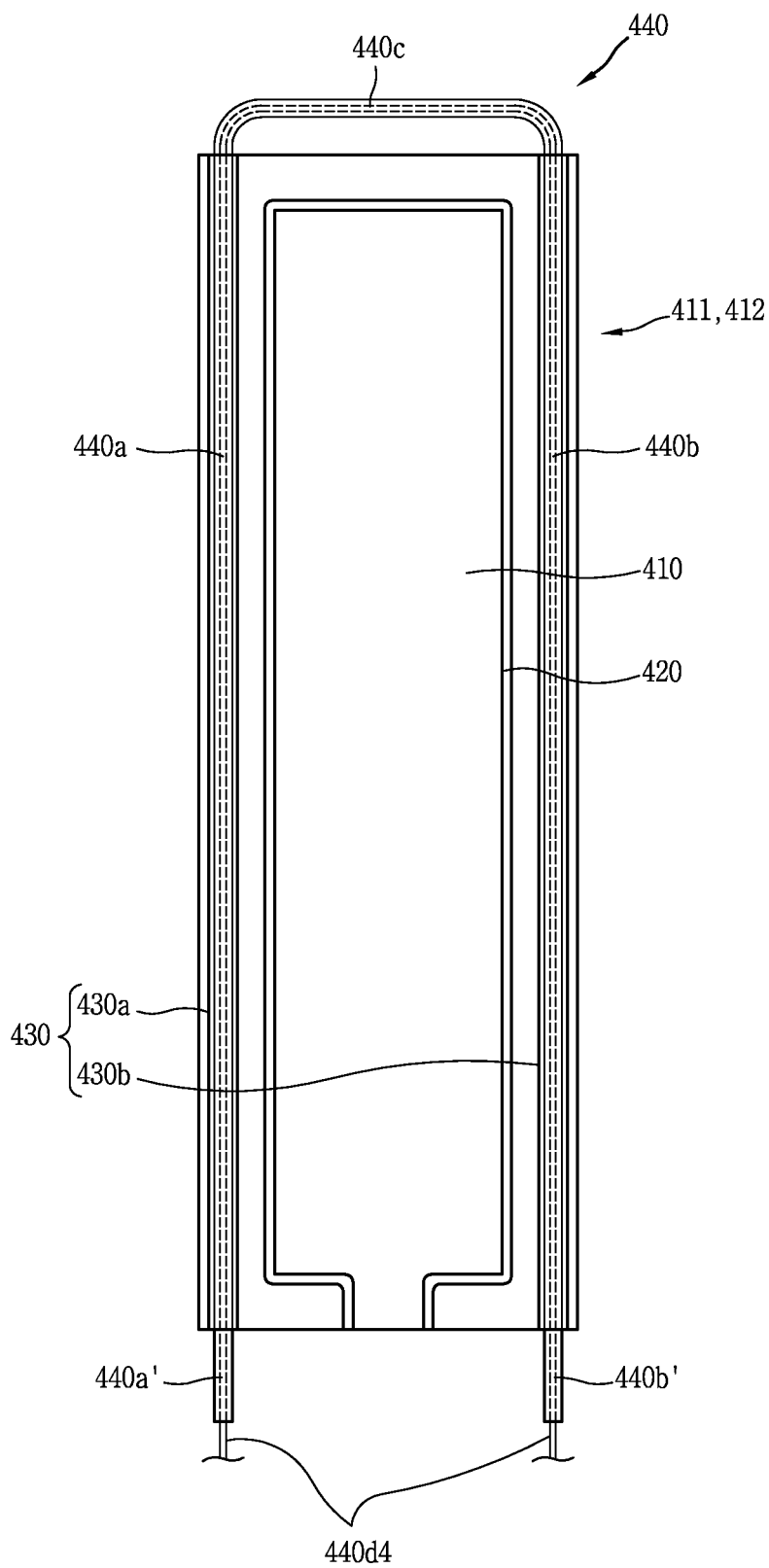
FIG. 20 is a conceptual view illustrating an unfolded state before an evaporator case illustrated in FIG. 18 is bent.

FIG. 20 is a conceptual view illustrating an unfolded state of the evaporator case 410 illustrated in FIG. 18 before being bent.

Referring to FIG. 20, in a state in which the cooling tube 420 and the heating tube 430 are formed in first and second case sheets 411 and 412 coupled to each other, the hot wire heater 440 is inserted into the heating tube 430.

The heating tube 430 includes a first heating flow channel 430a and a second heating flow channel 430b which are disposed on both sides of the cooling tube 420. The first and second heating flow channels 430a and 430b are respectively open at both ends of the evaporator case 410.

For inserting the hot wire heater 440, inner diameters of the first and second heating flow channels 430a and 430b are formed to be larger than a diameter of the hot wire heater 440. Referring to FIG. 19, it can be seen that, in a state in which the hot wire heater 440 is inserted into the first and second heating flow channels 430a and 430b, an empty space 431 is present in the first and second heating flow channels 430a and 430b. The empty space 431 may be filled with an air layer or may be in a vacuum state. To this end, both ends of the first and second heating flow channels 430a and 430b may be open or closed.

In addition, if the first and second heating flow channels 430a and 430b are bent, it may be impossible for the hot wire heater 440 to be inserted or insertion of the hot wire heater 440 may require a considerable effort and time, if ever. Therefore, for the purpose of mass-production, the first and second heating flow channels 430a and 430b may have a linear shape extending in one direction to facilitate insertion of the hot wire heater 440. In this drawing, it is illustrated that the first and second heating flow channels 430a and 430b extend along both sides of the first and second case sheets 411 and 412, which are coupled to each other.

The hot wire heater 440 may be configured to sequentially pass through the first and second heating flow channels 430a and 430b. To this end, the hot wire heater 440 may include a first portion 440a, a second portion 440b, and a connection portion 440c.

Specifically, a portion inserted into the first heating flow channel 430a forms the first portion 440a, a portion inserted into the second heating flow channel 430b forms the second portion 440b, and a portion connecting the first portion 440a and the second portion 440b outside the evaporator case 410 forms the connection portion 440c. In terms of insertion order, the hot wire heater 440 includes the first portion 440a, the connection portion 440c, and the second portion 440b, and a direction in which the first portion 440a is inserted into the first heating flow channel 430a and extends and a direction in which the second portion 440b is inserted into the second heating flow channel 430b and extends are opposite to each other.

When the connection portion 440c is positioned on one side of the first and second case sheets 411 and 412, a first extending portion 440a' extending outwardly from the first portion 440a and a second extending portion 440b' extending outwardly from the second portion 440b are electrically connected to a power supply unit (not illustrated). The hot wire heater 440 is formed to generate heat when power is applied through the power supply unit.

In the above, the case where one hot wire heater 440 is disposed in the first and second heating flow channels 430a and 430b has been described, but the present disclosure is not limited thereto. The hot wire heater 440 may be configured as first and second hot wire heaters respectively corresponding to the first and second heating flow channels 430a and 430b.

Meanwhile, since the heating tube 430 extends from one end portion of the first and second case sheets 411 and 412 toward the other end thereof, and thus, in a state in which the first and second case sheets 411 and 412 are bent to form the box-shaped evaporator case 410, the hot wire heater 440 inserted into the heating tube 430 is formed to surround the evaporator case 410.

For example, as illustrated, in case where the first and second heating flow channels 430a and 430b extend along both sides of the first and second case sheets 411 and 412, the first portion 440a inserted into the first flow channel 430a is formed to surround a front portion of the evaporator case 410 and the second portion 440b inserted into the second heating flow channel 430b is formed to surround a rear portion of the evaporator case 410. When the hot wire heater 440 is configured to surround the front and rear portions of the evaporator case 410 as described above, there is an advantage that defrosting may be performed over the entire area of the evaporator case 410.

However, the present disclosure is not limited to the above structure. The heating tube 430 may be formed at a central portion of the evaporator case 410 or at the front portion or the rear portion of the evaporator case 410. Of course, even in the modified structure, the cooling tube 420 must be patterned in the evaporator case 410 such that it does not overlap the heating tube 430.

Figure 21:
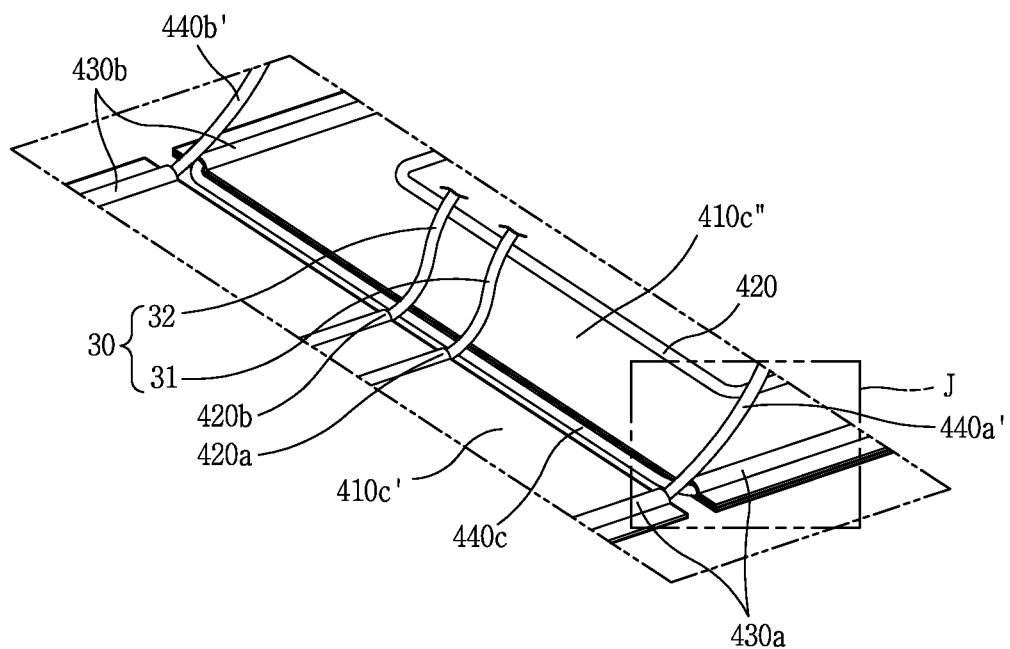
FIG. 21 is an enlarged view of a portion H illustrated in FIG. 18.
Figure 22:
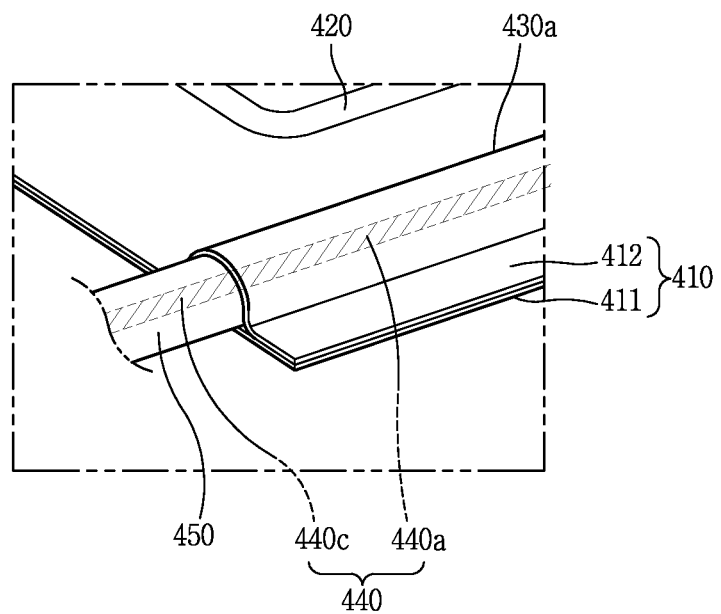
FIG. 22 is an enlarged view of a portion J illustrated in FIG. 21.

FIG. 21 is an enlarged view of portion H illustrated in FIG. 18, and FIG. 22 is an enlarged view of portion J illustrated in FIG. 21.

Referring to FIGS. 21 and 22 together with the foregoing drawings, in a state in which the hot wire heater 440 is inserted into the heating tube 440, the first and second case sheets 411 and 412 are bent to form the evaporator case 410 in the form of a box opened forwards and backwards. For example, the evaporator case 410 may have a lower surface, a left side surface and a right side surface extending to both sides from the lower surface, and a left side upper surface 410c' and a right side upper surface 410c" respectively extending from the left side surface and the right side surface to face the lower surface.

Here, one end portion of each of the first and second heating flow channels 430a and 430b is opened at the left side upper surface 410c' of the evaporator case 410, and the other end portion of each of the first and second heating flow channels 430a and 430b is opened at the right side upper surface 410c" of the evaporator case 410. As illustrated, the first extending portion 440a' and the second extending portion 440b' described above may extend to the outside through one end portions of the first and second heating flow channels 430a and 430b so as to be electrically connected to a power supply unit (not shown), and a connection portion 440c of the hot wire heater 440 may be positioned at the other end portion of each of the first and second heating flow channels 430a and 430b.

As illustrated in FIG. 21, the both open end portions of the first and second heating flow channels 430a and 430b may be arranged to face each other at an upper portion of the evaporator case 410, respectively. The first and second heating flow channels 430a and 430b are formed to extend parallel to both sides of the first and second case sheets 411 and 412 to facilitate insertion of the hot wire heater 440.

In order to prevent interference between portions of the hot wire heater 440 extending through one end portions and the other end portions of the first and second heating flow channels 430a and 430b, the both open end portions of the first and second heating flow channels 430a and 430b may be spaced apart from each other along a width direction of the evaporator case 410. Here, the width direction of the evaporator case 410 corresponds to a direction from the front portion to the rear portion of the evaporator case 410 or a direction in which a gap between the left side upper surface 410c' and the right side upper surface 410c".

The connection portion 440c of the hot wire heater 440 is positioned on the other end side of each of the first and second heating flow channels 430a and 430b, and in consideration of the connection portion 440c extending in a direction from the front portion of the evaporator case 410 toward the rear portion thereof (extending along a gap between the left side upper surface 410c' and the right side upper surface 410c"), one end portion of each of the first and second heating flow channels 430a and 430b may be positioned to be spaced apart from each other to an outer side (i.e., to the adjacent front portion and the rear portion side) of the evaporator case 410, relative to the other end portion thereof.

In this case, as illustrated in FIG. 20, in a state in which the evaporator case 410 is unfolded before being bent, the first and second heating flow channels 430a and 430b may be formed to be sloped with respect to both sides of the first and second case sheets 411 and 412 which are coupled to each other.

The connection portion 440c of the hot wire heater 440 is configured to connect the first portion 440a and the second portion 440b on the outer side of the evaporator case 410. Since the connection portion 440c is exposed to the outside of the evaporator case 410, the connection portion 440c may be physically and electrically damaged by repetition of frosting and defrosting.

In consideration of this, a heat-resistant tube 450 may be formed to cover the connection portion 440c. The heat-resistant tube 450 is formed of a heat-resistant material so as not to be thermally damaged by the high-temperature connection portion 440c. By the heat-resistant tube 450, the connection portion 440c exposed to the outside of the evaporator case 410 may be protected from an external environment, and as a result, defrosting reliability may be improved.

In addition, a packing member (not illustrated) for preventing inflow of defrost water may be mounted on both ends of the first and second heating flow channels 430a and 430b. The packing member may be adhered to the heat-resistant tube 450 to prevent defrost water from flowing into the heat-resistant tube 450. That is, the first and second heating flow channels 430a and 430b and the heat-resistant tube 450 may be sealed by the packing member.

Figure 23:
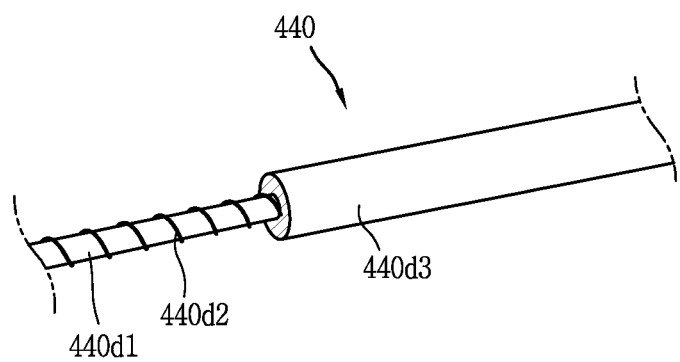
FIG. 23 is a conceptual view illustrating a specific structure of a hot wire heater illustrated in FIG. 18.

FIG. 23 is a conceptual view illustrating a detailed structure of the hot wire heater 440 illustrated in FIG. 18, in which a portion of the hot wire heater 440 is cut.

Referring to FIG. 23, the hot wire heater 440 has high heat resistance and is formed to be freely bendable. The hot wire heater 440 includes a core portion 440d1, a hot wire portion 440d2, and a covering portion 440d3.

The core portion 440d1, which is a portion around which the hot wire portion 432 is wound, is formed of an insulating material. For example, the core portion 440d1 may be formed of glass fiber.

The hot wire portion 440d2 is wound on an outer circumference of the core portion 440dl and is electrically connected to a power supply portion (not illustrated) to generate heat when power is applied. A nickel-chromium-based hot wire may be used for the hot wire portion 440d2. The hot wire portion 440d2 may extend in a length direction of the core portion 440dl. In this embodiment, in order to improve a heating temperature per unit area, it is illustrated that the hot wire portion 440d2 is wound around the core portion 440d1 densely like a coil.

The covering portion 440d3 is formed of an insulating material and covers the hot wire portion 440d2. The covering portion 440d3 may be formed of a heat-resistant synthetic resin material (e.g., silicone rubber, PVC, or the like).

The above-described structure is an example of the hot wire heater 440, and the hot wire heater 440 of the present disclosure is not necessarily limited thereto. Any component may be employed as the hot wire heater 440 as long as it is formed as a cable and generates heat when power is applied.

Figure 24:
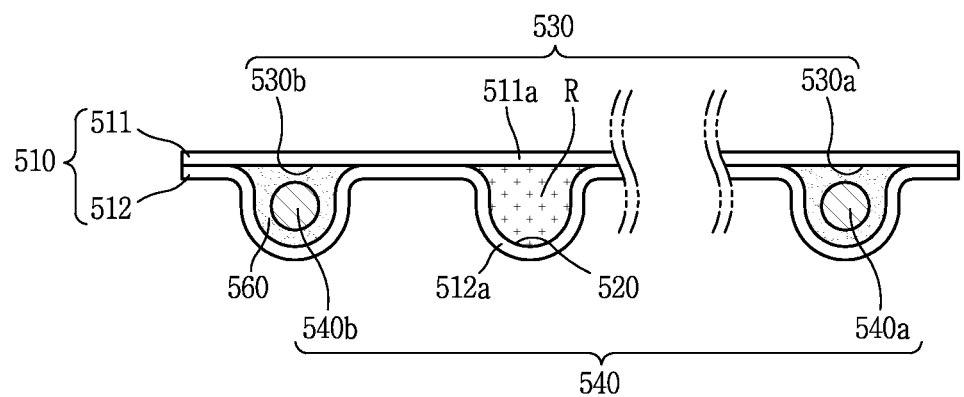
FIGS. 24 and 25 are conceptual views illustrating a first modification of the second embodiment.
Figure 25:
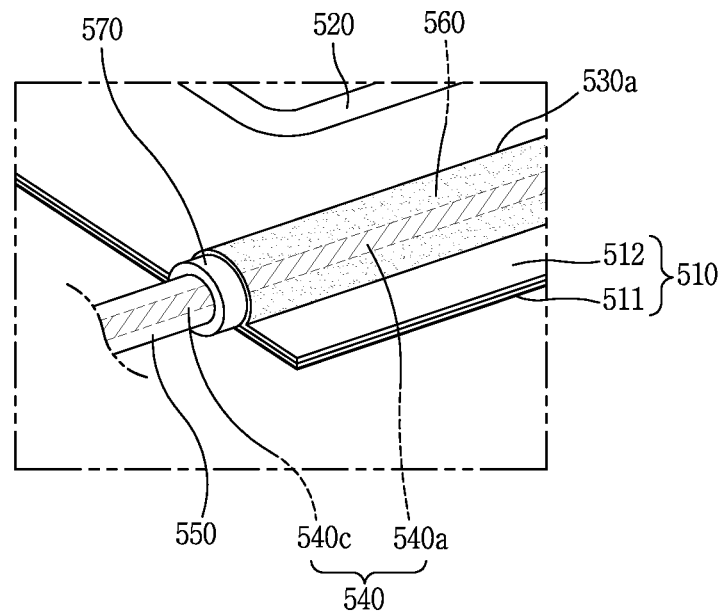

FIGS. 24 and 25 are conceptual views illustrating a first modification of the second embodiment.

In the first modification, as in the second embodiment of the evaporator 400 described above, an inner diameter of first and second heating flow channels 530a and 530b is formed to be greater than a diameter of a hot wire heater 540 so that the hot wire heater 540 may be inserted thereinto. However, in the second embodiment of the evaporator 400 described above, a space that remains after the hot wire heater remains as the empty space 431 in the first and second heating flow channels 430a and 430b, but in the first modification, the empty space is filled with a filler 560. In other words, the remaining internal space, excluding the hot wire heater 540 is filled with the filler 560 for heat transfer in the first and second heating flow channels 530a and 530b.

The filler 560 may be a refrigerant (e.g., R-134a or R-600a, etc.) which is present in a liquid state under a freezing condition of the refrigerator 1 and which is changed into a gaseous phase when heated to transfer heat.

A packing member 570 for preventing leakage of the filler 560 may be mounted on both ends of the first and second heating flow channels 530a and 530b. To this end, the packing member 570 is formed to surround the hot wire heater 540 and is inserted into both ends of the first and second heating flow channels 530a and 530b which are at least partially opened, to seal both ends.

A connection portion 540c of the hot wire heater 540 is configured to connect a first portion 540a and a second portion 540b on an outer side of the evaporator case 510. As in the first embodiment of the evaporator 400 described above, the connection portion 540c may be surrounded by a heat-resistant tube 550 so as to be protected.

The packing member 570 described above may be configured to be in close contact with the heat-resistant tube 550 to prevent defrost water from flowing into the heat-resistant tube 550. That is, the first and second heating flow channels 530a and 530b and the heat-resistant tube 550 may be sealed by the packing member 570.

Figure 26:
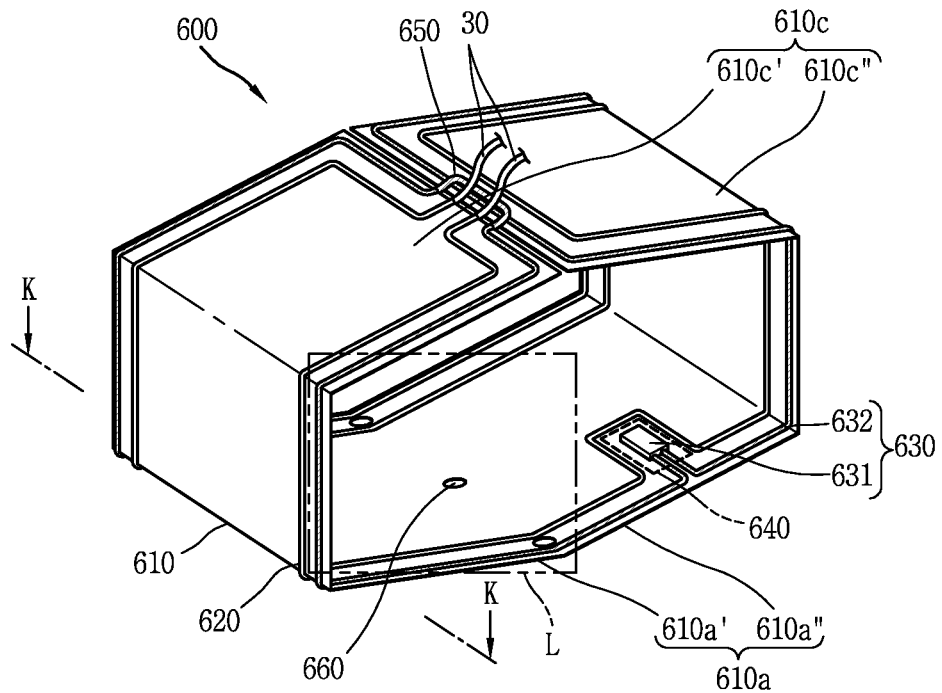
FIG. 26 is a conceptual view illustrating a third embodiment of an evaporator applied to the refrigerator of FIG. 1.
Figure 27:
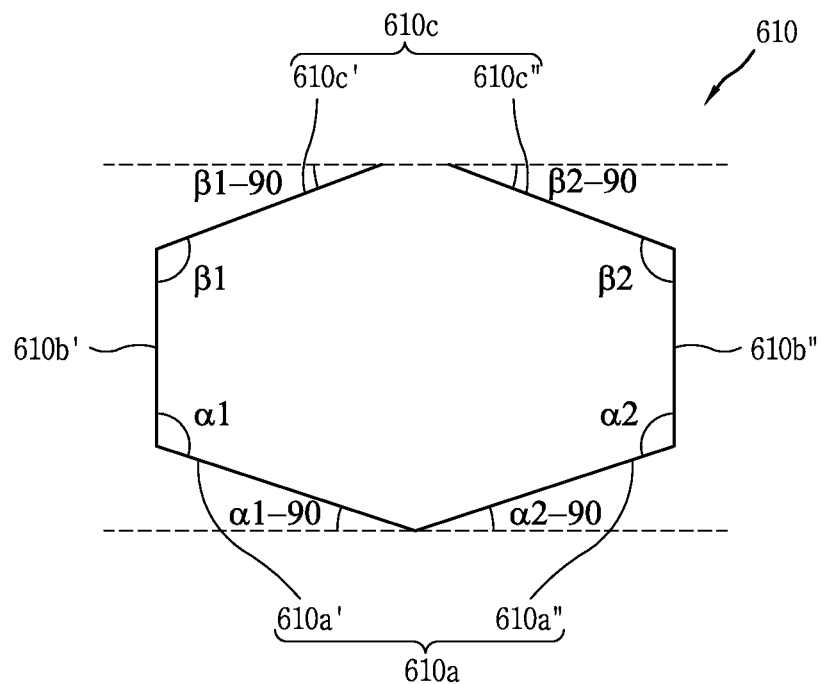
FIG. 27 is a conceptual view briefly illustrating a shape of the evaporator illustrated in FIG. 26.
Figure 28:
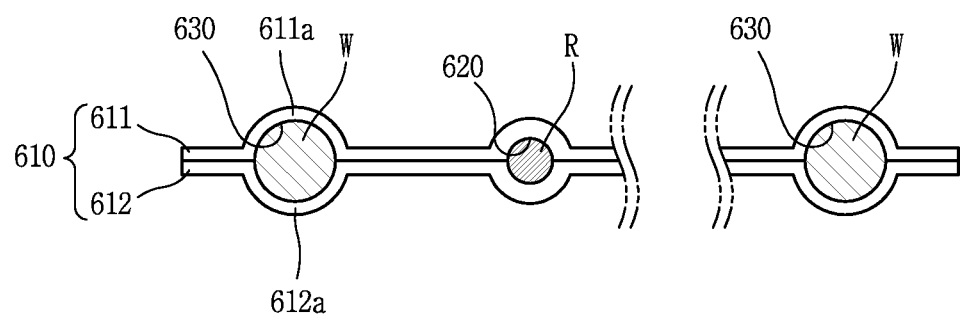
FIG. 28 is a cross-sectional view of the evaporator illustrated in FIG. 26 taken along line K-K.

FIG. 26 is a conceptual view illustrating a third embodiment of an evaporator 600 applied to the refrigerator 1 of FIG. 1, FIG. 27 is a conceptual view schematically illustrating a shape of the evaporator 600 illustrated in FIG. 26, and FIG. 28 is a cross-sectional view taken along line K-K of the evaporator 600 illustrated in FIG. 26.

Referring to FIG. 26 to FIG. 28, the third embodiment is different from the foregoing embodiments and modifications in that a cooling tube 620 and a heating tube 630 are formed to protrude not only from the outer surface of the evaporator case 610 but also from the inner surface thereof. That is, the cooling tube 620 and the heating tube 630 are formed by a convex portion 611a of a first case sheet 611 and a convex portion 612a of a second case sheet 612.

For reference, in the third embodiment, a structure in which the heating tube 630 is filled with the working fluid W and the working fluid W is heated by the heater 640 to perform a defrosting operation is illustrated as an example. However, the present disclosure is not limited thereto. The third embodiment may also be applied to a structure in which a hot wire heater is inserted into the heating tube 630 and power is applied according to predetermined conditions to cause the hot wire heater to generate heat.

When the evaporator 600 has the above structure, defrost water generated from an upper surface of the evaporator case 610 may directly fall to the bottom and affect stored food or defrost water may gather between the cooling tube 620 and heating tube 630 and drainage may not be smoothly performed.

In order to solve the above-described problems, in the third embodiment, at least one of a lower surface 610a and an upper surface 610c of the evaporator case 610 includes first sloped portions 610a' and 610c' and second sloped portions 610a" and 610c". The first sloped portions 610a' and 610c' are sloped at obtuse angles α1 and β1 with respect to a left side surface 610b' and the second sloped portions 610a" and 610c" are sloped at obtuse angles α2 and β2 with respect to a right side surface 610b". The second sloped portions 610a" and 610c" may be connected to the first sloped portions 610a' and 610c' at an obtuse angle.

In the third embodiment, it is illustrated that the first and second sloped portions 610a', 610a", 610c', and 610c" are formed on both lower surface 610a and upper surface 610c of the evaporator case 610. As illustrated, when the evaporator case 610 is viewed from the front, the evaporator case 610 has a hexagonal shape.

Specifically, the lower surface 610a of the evaporator case 610 includes the first sloped portion 610a' and the second sloped portion 610a" formed to be sloped downwardly toward the insides facing each other. Also, the left side upper surface (i.e., the first sloped portion 610c') of the evaporator case 610 extends to be sloped upwards from the left side surface 610b', and the right side upper surface (i.e., the second sloped portion 610c") extends to be sloped upwards from the right side surface 610b". Here, an end portion of the left side upper surface 610c' and an end portion of the right side upper surface 610c" may be disposed to face each other.

According to the above structure, since defrost water generated from the upper surface of the evaporator case 610 flows along the first and second sloped portions 610c' and 610c" of the upper surface 610c to the left side surface 610b' and the right side surface 610b", the problem that defrost water falls directly onto the lower surface 610a may be solved. In addition, since defrost water flows along the first and second sloped portions 610a' and 610a" of the lower surface 610a of the evaporator case 610 to gather at a connection portion, defrost water may be smoothly drained.

A width of the first sloped portion 610a' of the lower surface 610a of the evaporator case 610 and a width of the second sloped portion 610a" may be set to be equal to each other. That is, the connection portion of the first and second sloped portions 610a' and 610a" may be located at a point which is a half of the entire width of the evaporator case 610. The connection portion may extend in the front-rear direction of the evaporator case 610. In this structure, a chamber 631 may be formed on one side of the connection portion, that is, on any one of the first and second sloped portions 610a' and 610a".

The sloped angles of the first and second sloped portions 610a' and 610a" formed on the lower surface 610a of the evaporator case 610 with respect to the left side surface 610b' and the right side surface 610b" may be 93° to 95°. This means that the first and second sloped portions 610a' and 610a" have a sloped angle of 3° to 5° with respect to the flat lower surface 110a as compared with the first embodiment in which the lower surface 110a of the evaporator case 110 is formed flat.

If the angle is less than 3°, there is a problem that defrost water does not easily flow along the first and second slopes 610a' and 610a". Also, if the angle exceeds 5°, there is a problem that food slides along the first and second slopes 610a' and 610a" and the first and second slopes 610a' and 610a" may be clearly apparent to negatively affect an aesthetic sense the user may be feel.

Figure 29:
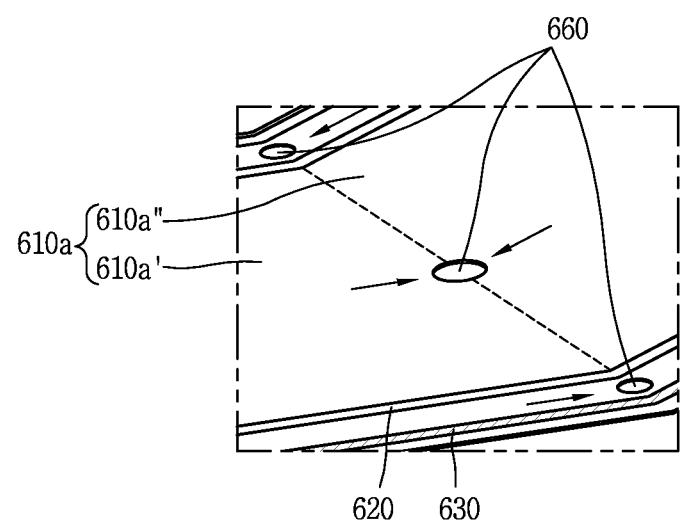
FIG. 29 is an enlarged view of a portion L illustrated in FIG. 26.

FIG. 29 is an enlarged view of portion L illustrated in FIG. 26.

Referring to FIG. 29, a drain hole 660 may be formed at a connection portion between the first sloped portion 610a' and the second sloped portion 610a" formed on the lower surface of the evaporator case 610. A guide tray (not shown) provided at a lower portion of the evaporator 600 is formed to communicate with the drain hole 660.

A plurality of drain holes 660 may be disposed at predetermined intervals along the connection portion, that is, along the front-rear direction of the evaporator case 610. Here, the drain holes 660 may be disposed between the cooling tube 620 and the heating tube 630.

Thus, since the drain hole 660 is formed at the connection portion, defrost water may be smoothly performed. In addition, since the drain holes 660 are disposed between the cooling tube 620 and the heating tube 630, defrost water gathering between the cooling tube 620 and the heating tube 630 may be smoothly drained.

What is claimed is:
1. An evaporator comprising:
an evaporator case comprising a first case panel having a first surface and a second surface, and a second case panel having a first surface and a second surface, the first and second case panels being collectively bent a plurality of times to form a shell having a first open side and a second open side;

a cooling channel formed between the first and second case panels and through which a refrigerant flows; and a heating channel formed between the first and second case panels, wherein the cooling channel and the heating channel are mutually exclusive, wherein the cooling channel and the heating channel protrude outwards from the evaporator case and an inner surface of the evaporator case is formed to be flat, wherein the first surface of the first case panel is the inner surface of the evaporator case and the first surface of the second case panel is an outer surface of the evaporator case, and wherein:
the first case panel and the second case panel are made of a metal material,
a working fluid configured to perform a defrosting operation is provided in the heating channel,
the heating channel includes a chamber formed between a flat portion of the first case panel and a protruding region of the second case panel so that a predetermined amount of the working fluid stays inside the chamber, and
a heater is attached to an outer surface of the chamber to heat the working fluid inside the chamber.

2. The evaporator of claim 1, wherein the cooling channel and the heating channel are each formed by a plane portion of the first case panel, and a convex portion of the second case panel that forms the outer surface of the evaporator case.

3. The evaporator of claim 2, wherein a distance from the second surface of the first case panel opposite the first surface of the first case panel to an apex of the convex portion of one of the cooling channel or the heating channel is 1.6 mm to 1.8 mm.

4. The evaporator of claim 1, wherein at least one of a lower surface and an upper surface of the evaporator case has a first sloped portion sloped at an obtuse angle with respect to a left side surface; and a second sloped portion sloped at an obtuse angle with respect to a right side surface and connected to the first sloped portion at an obtuse angle.

5. The evaporator of claim 4, wherein a drain hole is formed at a joint between the first sloped portion and the second sloped portion formed at the lower surface of the evaporator case.

6. The evaporator of claim 1, wherein:
the protruding region of the chamber has a prescribed width and a prescribed length, and
the protruding region includes:
a flat portion which has a rectangle shape to be in contact with the heater, and
rounded edge portions which are formed outside of edges of the flat portion.

7. The evaporator of claim 6, wherein:
the chamber includes an outlet through which the working fluid heated by the heater is discharged and an inlet through which the working fluid is received, and
a flow pipe is connected to the outlet and the inlet to form a flow channel in which the working fluid flows.

8. The evaporator of claim 7, wherein the prescribed width of the protruding region of the chamber is 10 mm to 12 mm, and the prescribed length of the protruding region of the chamber is 47 mm to 80 mm.

9. The evaporator of claim 1, further comprising a hot wire heater inserted into the heating channel to surround the evaporator case and configured to generate heat when power s applied to the hot wire heater.

10. The evaporator of claim 9, wherein the heating channel comprises a first heating channel and a second heating channel respectively provided on both sides of the cooling channel.

11. The evaporator of claim 10, wherein the hot wire heater comprises:
a first section inserted into the first heating channel;
a second section inserted into the second heating channel; and
a connection section that connects the first section and the second section at an outer side of the evaporator case.

12. The evaporator of claim 10, wherein each of the first and second heating channels includes a filler that surrounds the hot wire heater.

13. An evaporator comprising:
an evaporator case comprising a first case panel having a first surface and a second surface and a second case panel having a first surface and a second surface collectively bent a plurality of times to form a shell having a first open side and a second open side;
a cooling channel formed between the first and second case panels through which a refrigerant flows; and
a heating channel formed between the first and second case panels, wherein the cooling channel and the heating channel are mutually exclusive,
wherein at least one of a lower surface and an upper surface of the evaporator case has a first sloped portion sloped at an obtuse angle respect to a left side surface and a second sloped portion sloped at an obtuse angle with respect to a right side surface and connected to the first sloped portion at an obtuse angle, and
wherein:
the first case panel and the second case panel are made of a metal material,
a working fluid configured to perform a defrosting operation is provided in the heating channel,
the heating channel includes a chamber formed between a flat portion of the first case panel and a protruding region of the second case panel so that a predetermined amount of the working fluid stays inside the chamber, and
a heater is attached to an outer surface of the chamber to heat the working fluid inside the chamber.

14. The evaporator of claim 13, wherein a drain hole is formed at a joint between the first sloped portion and the second sloped portion formed at the lower surface of the evaporator case.

15. The evaporator of claim 14, wherein a plurality of drain holes is provided and located between the cooling channel and the heating channel.

16. The evaporator of claim 13, wherein:
the protruding region of the chamber has a prescribed width and a prescribed length, and
the protruding region includes a flat portion which has a rectangle shape to be in contact with the heater, and rounded edge portions which are formed outside of edges of the flat portion.

17. A method for manufacturing an evaporator, the method comprising:
arranging a first mold and a second mold between first and second case panels in a non-overlapping manner;
bonding the first and second case sheets to each other;

attaching the first case panel to a first jig plate and arranging a second jig plate to be spaced apart from the second case panel;

forcing high pressure air to the first mold and the second mold exposed to the outside from the first and second case panels to form a cooling channel that corresponds to the first mold and a heating channel that corresponds to the second mold; and bending the bonded first and second case panels to form an evaporator case shell having a first open side and a second open side.

18. The method of claim 17, wherein the cooling channel and the heating channel protrude to the outside of the evaporator case shell and an inner surface of the evaporator case shell is flat.

19. The method of claim 18, wherein the cooling channel and the heating channel are each formed by a plane portion of the first case panel that forms the inner surface of the evaporator case shell; and a convex portion of the second case panel that forms an outer surface of the evaporator case shell.

20. The method of claim 19, wherein a length at which the convex portion protrudes is limited by a distance of the second jig plate from the first jig plate.

* * * * *